US008374780B2

(12) United States Patent
Mays et al.

(10) Patent No.: US 8,374,780 B2
(45) Date of Patent: Feb. 12, 2013

(54) OPEN AREA MAPS WITH RESTRICTION CONTENT

(75) Inventors: Joseph P. Mays, Chicago, IL (US); William N. Gale, Oak Park, IL (US); Peter A. Seegers, Evanston, IL (US); Matei N. Stroila, Chicago, IL (US)

(73) Assignee: Navteq B.V., Veldhoven (NL)

( * ) Notice: Subject to any disclaimer, the term of this patent is extended or adjusted under 35 U.S.C. 154(b) by 371 days.

(21) Appl. No.: 12/179,676

(22) Filed: Jul. 25, 2008

(65) Prior Publication Data
US 2010/0023249 A1    Jan. 28, 2010

(51) Int. Cl.
*G01C 21/00* (2006.01)
(52) U.S. Cl. .................. 701/433; 701/434; 701/435
(58) Field of Classification Search .......... 701/200, 701/201, 206–208, 213, 214, 209, 433, 434, 701/435, 410, 411, 408; 345/629, 630, 419; 342/357.07
See application file for complete search history.

(56) References Cited

U.S. PATENT DOCUMENTS

| | | |
|---|---|---|
| 4,674,048 A | 6/1987 | Okumura |
| 4,674,773 A | 6/1987 | Stone et al. |
| 4,847,773 A | 7/1989 | Van Helsdingen et al. |
| 5,032,775 A | 7/1991 | Mizuno et al. |
| 5,161,886 A | 11/1992 | De Jong et al. |
| 5,272,638 A | 12/1993 | Martin et al. |
| 5,305,217 A | 4/1994 | Nakamura et al. |
| 5,491,641 A | 2/1996 | Scepanovic et al. |
| 5,764,510 A | 6/1998 | Cameron et al. |
| 5,842,145 A | 11/1998 | Zimmer |
| 5,938,720 A | 8/1999 | Tamai |
| 6,038,559 A | 3/2000 | Ashby et al. |
| 6,167,332 A | 12/2000 | Kurtzberg et al. |
| 6,240,363 B1 | 5/2001 | Theimer et al. |
| 6,259,990 B1 | 7/2001 | Shojima et al. |
| 6,269,291 B1 | 7/2001 | Segeren |
| 6,272,237 B1 | 8/2001 | Hashima |
| 6,321,158 B1 | 11/2001 | DeLorme et al. |
| 6,604,126 B2 | 8/2003 | Neiman et al. |
| 6,728,636 B2 | 4/2004 | Kokojima et al. |
| 6,782,319 B1 | 8/2004 | McDonough |
| 6,841,963 B2 | 1/2005 | Song et al. |
| 6,854,153 B1 | 2/2005 | Mueller |
| 7,031,725 B2 | 4/2006 | Rorabaugh |
| 7,058,504 B2 | 6/2006 | McDonough |
| 7,062,377 B2 | 6/2006 | McDonough |

(Continued)

FOREIGN PATENT DOCUMENTS

JP    05334430    * 12/1993

OTHER PUBLICATIONS

Trier and Taxt. *Improvement of "Integrated Function Algorithm" for Binarization of Document Images*. University of Oslo, pp. 39-44, 1994. http://citeseerx.ist.psu.edu/viewdoc/summary?doi=10.1.1.51.4222.

(Continued)

*Primary Examiner* — Thomas Black
*Assistant Examiner* — Marthe Marc-Coleman

(57) ABSTRACT

Open area maps and related systems and methods are disclosed. For example, one method includes receiving an image of a layout corresponding to a real-world area in which a person walks about. A restriction associated to a passageway within the image is generated. The image is used to generate a routable map for point-to-point routing. Routing through or around the restriction is based on whether or not criteria for passing the restriction is met.

28 Claims, 14 Drawing Sheets

U.S. PATENT DOCUMENTS

| | | | |
|---|---|---|---|
| 7,260,474 | B1 | 8/2007 | Thayathil et al. |
| 7,272,492 | B2 | 9/2007 | McCubbin et al. |
| 7,308,118 | B1 | 12/2007 | Meadows |
| 7,376,510 | B1 | 5/2008 | Green |
| 7,386,163 | B2 | 6/2008 | Sabe et al. |
| 7,389,210 | B2 | 6/2008 | Kagarlis |
| 7,421,341 | B1 | 9/2008 | Hopkins et al. |
| 7,439,878 | B2 | 10/2008 | Kato et al. |
| 7,483,917 | B2 | 1/2009 | Sullivan et al. |
| 7,496,445 | B2 * | 2/2009 | Mohsini et al. ............... 701/206 |
| 7,512,485 | B2 | 3/2009 | Hudson et al. |
| 7,543,882 | B2 | 6/2009 | Day et al. |
| 7,587,274 | B2 * | 9/2009 | Kaldewey et al. ............ 701/208 |
| 7,598,966 | B2 | 10/2009 | Rye et al. |
| 7,633,383 | B2 | 12/2009 | Dunsmoir et al. |
| 7,660,441 | B2 | 2/2010 | Chen et al. |
| 7,672,778 | B1 | 3/2010 | Elliott |
| 7,711,687 | B2 | 5/2010 | Rappaport et al. |
| 7,719,542 | B1 | 5/2010 | Gough et al. |
| 7,751,971 | B2 | 7/2010 | Chang et al. |
| 7,765,499 | B2 | 7/2010 | De Graeve et al. |
| 7,769,491 | B2 | 8/2010 | Fukuchi et al. |
| 7,801,904 | B2 | 9/2010 | Natesan et al. |
| 7,856,312 | B2 | 12/2010 | Coombes et al. |
| 7,865,267 | B2 | 1/2011 | Sabe et al. |
| 7,873,469 | B2 | 1/2011 | D'Andrea et al. |
| 7,953,551 | B2 | 5/2011 | Park et al. |
| 7,957,894 | B2 | 6/2011 | Wellmann |
| 2001/0051851 | A1 | 12/2001 | Suzuki et al. |
| 2002/0128771 | A1 | 9/2002 | Nagaki |
| 2002/0168084 | A1 * | 11/2002 | Trajkovic et al. ............. 382/100 |
| 2003/0210139 | A1 | 11/2003 | Brooks et al. |
| 2004/0113937 | A1 | 6/2004 | Sawdey et al. |
| 2005/0000543 | A1 | 1/2005 | Taylor et al. |
| 2005/0038578 | A1 | 2/2005 | McMurtry et al. |
| 2005/0102097 | A1 | 5/2005 | Tanizaki et al. |
| 2006/0058950 | A1 | 3/2006 | Kato et al. |
| 2006/0149465 | A1 * | 7/2006 | Park et al. ...................... 701/209 |
| 2006/0241827 | A1 | 10/2006 | Fukuchi et al. |
| 2007/0093955 | A1 | 4/2007 | Hughes |
| 2007/0118821 | A1 | 5/2007 | Yee et al. |
| 2007/0219711 | A1 | 9/2007 | Kaldewey et al. |
| 2007/0233367 | A1 | 10/2007 | Chen et al. |
| 2007/0253640 | A1 * | 11/2007 | Brett ............................. 382/276 |
| 2008/0091340 | A1 | 4/2008 | Milstein et al. |
| 2008/0183483 | A1 | 7/2008 | Hart |
| 2008/0220862 | A1 | 9/2008 | Axelrod et al. |
| 2008/0312819 | A1 * | 12/2008 | Banerjee ....................... 701/202 |
| 2009/0012667 | A1 | 1/2009 | Matsumoto et al. |
| 2009/0043504 | A1 * | 2/2009 | Bandyopadhyay et al. .. 701/213 |
| 2009/0063035 | A1 * | 3/2009 | Mandel et al. ................. 701/202 |
| 2009/0088916 | A1 | 4/2009 | Elgersma et al. |
| 2009/0138353 | A1 | 5/2009 | Mendelson |
| 2009/0150790 | A1 | 6/2009 | Wilhelm |
| 2009/0153549 | A1 | 6/2009 | Lynch et al. |
| 2009/0164111 | A1 | 6/2009 | Hosoi et al. |
| 2009/0164896 | A1 | 6/2009 | Thorn |
| 2009/0237396 | A1 * | 9/2009 | Venezia et al. ................. 345/419 |
| 2009/0292460 | A1 | 11/2009 | Kaldewey et al. |
| 2009/0292465 | A1 | 11/2009 | Kaldewey et al. |
| 2009/0300174 | A1 | 12/2009 | Floris et al. |
| 2009/0325595 | A1 | 12/2009 | Farris |
| 2010/0020093 | A1 | 1/2010 | Stroila et al. |
| 2010/0021012 | A1 | 1/2010 | Seegers et al. |
| 2010/0021013 | A1 | 1/2010 | Gale et al. |
| 2010/0023249 | A1 | 1/2010 | Mays et al. |
| 2010/0023250 | A1 | 1/2010 | Mays et al. |
| 2010/0023251 | A1 | 1/2010 | Gale et al. |
| 2010/0023252 | A1 | 1/2010 | Mays et al. |
| 2010/0057354 | A1 | 3/2010 | Chen et al. |
| 2010/0100323 | A1 | 4/2010 | Gnanasambandam et al. |
| 2010/0245912 | A1 | 9/2010 | Mount et al. |
| 2010/0275018 | A1 | 10/2010 | Pedersen |
| 2010/0299065 | A1 | 11/2010 | Mays |
| 2010/0324950 | A1 | 12/2010 | Merriam et al. |

OTHER PUBLICATIONS

Tombre, et al. *Text/Graphics Separation Revisited*. Loria, pp. 1-12, 2002. http://www.loria.fr/~tombre/tombre-das02.pdf.

Rosin and West. *Segmentation of Edges into Lines and Arcs*. Image and Vision Computing, vol. 7 Issue 2: pp. 109-114, May 1989.

Agarwal and Sharir. *Arrangements and Their Applications*. Handbook of Computational Geometry, pp. 49-59, 1998. http://citeseerx.ist.psu.edu/viewdoc/summary?doi=10.1.1.52.4976.

Siu-hang Or, et al. *Highly Automatic Approach to Architectural Floorplan Image Understanding & Model Generation*. Proceedings of Vision, Modeling & Visualization in Erlangen, Germany, pp. 1-9, Nov. 2005. http://www.cse.cuhk.edu.hk/~shor/project/building/.

Wein, et al. *Chapter 20: 2D Arrangements*. CGAL, pp. 1-27, referenced on Mar. 2008. http://www.cgal.org/Manual/3.3/doc_html/cgal_manual/Arrangement_2/Chapter_main.html.

*Lanczos Resampling*. Wikipedia, pp. 1-2, referenced on Mar. 2008. http://en.wikipedia.org/wiki/Lanczos_resampling.

*Inkscape*. An Open Source Vector Graphics Editor, pp. 1-2, referenced on Jun. 2008. http://www.inkscape.org/.

Clark and DeRose, eds. *XML Path Language (XPath), Version 1.0*. W3, pp. 1-37, referenced on Jun. 2008. http://www.w3.org/TR/xpath.

Selinger. *Potrace: Transforming Bitmaps into Vector Graphics*. pp. 1-8. http://potrace.sourceforge.net/.

LaValle. *Planning Algorithms, Chapter 8: Feedback Motion Planning*. Cambridge University Press, pp. 369-433, 2006. http://planning.cs.uiuc.edu/.

Lee. *3D Data Model for Representing Topological Relations of Urban Features*. Delaware County of Regional Planning Commission, pp. 1-15, referenced in 2008. http://gis.esri.com/library/userconf/proc01/professional/papers/pap565/p565.htm.

Rehrl, et al. *Combined Indoor/Outdoor Smartphone Navigation for Public Transport Travellers*. Austrian Research Centers, pp. 1-8, 2005. http://www.salzburgresearch.at/research/gfx/telecarto05_rehrl_final.pdf.

Walter, et al. *Shortest Path Analyses in Raster Maps for Pedestrian Navigation in Location Based Systems*. Stuttgart University, pp. 1-5, 2006. http://www.ifp.uni-stuttgart.de/publications/2006/walter06_ISPRS_CommIV_Goa.pdf.

Ishimaru, et al. "OWS-6 Outdoor and Indoor 3D Routing Services Engineering Report." 70th OGC Technical Committee. Darmstadt, Germany. Dated Sep. 30, 2009. pp. 1-30.

"Introduction to A*" From Amit's Thoughts on Pathfinding at http://theory.standford.edu/~amitp/GameProgramming/AStarComparison.html#dijkstras-algorithm-and-best-first-search as viewed on a way back machine capture dated Jun. 20, 2007.

* cited by examiner

OPEN AREA MAPS WITH RESTRICTION CONTENT

REFERENCE TO RELATED APPLICATIONS

The present patent application is related to the copending patent applications filed on the same date, Ser. No. 12/179,635, entitled "OPEN AREA MAPS," Ser. No. 12/179,668, entitled "COST BASED OPEN AREA MAPS," Ser. No. 12/179,680, entitled "END USER IMAGE OPEN AREA MAPS," Ser. No. 12/179,692, entitled "POSITIONING OPEN AREA MAPS," Ser. No. 12/179,713, entitled "OPEN AREA MAPS WITH GUIDANCE," and Ser. No. 12/179,726, entitled "OPEN AREA MAPS BASED ON VECTOR GRAPHICS FORMAT IMAGES," the entire disclosures of which are incorporated by reference herein.

BACKGROUND OF THE INVENTION

The present invention relates to navigation and, more particularly, to open area maps that may be used for routing.

As the world population increases, more and more infrastructure, buildings, exterior and interior development, and other features to support human growth are being generated. Also, existing, infrastructure, buildings, parks, and other environments are being adapted to accommodate more people and traffic. The increase and adaptation of environments impacts travel and how people go from one place to another.

Navigation systems and/or devices are used to aid travel. For example, vehicle navigation devices may assist a person driving on a road network. Such devices may provide routing and guidance to a desired destination based on existing roads or pathways.

However, there are areas in which people move about that do not have set roads, tracks, or paths or in which such paths are not needed to travel from one point to another within the area. For example, floors of a building, parks, or other exterior or interior areas are treaded upon on a daily basis. People are able to move about in such areas in any number of patterns to get from one place to another. However, some movement or patterns of movement in these areas may be inefficient or unnecessary based on unexpected restrictions or conditions, confusion, lack of knowledge of the layout of an area, or other factors. Also, a person may not know how to get from one point to a desired destination in such areas.

SUMMARY OF THE INVENTION

According to one aspect, a method of generating an open area map is provided. The method includes receiving an image of a layout corresponding to a real-world area in which a person walks about. A restriction associated to a passageway within the image is generated. The image is used to generate a routable map for point-to-point routing. Routing through or around the restriction is based on whether or not criteria for passing the restriction is met.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
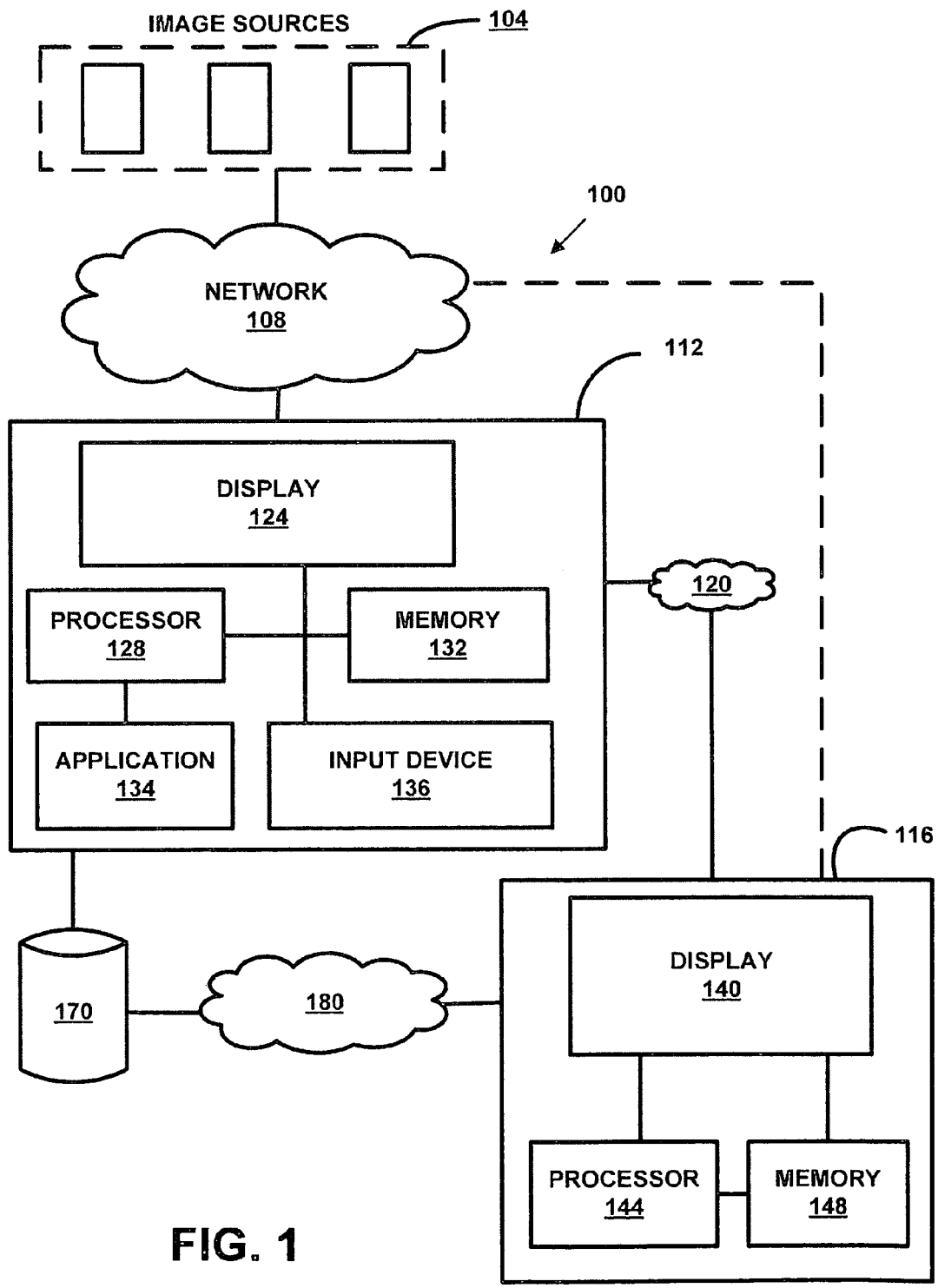
FIG. 1 is a diagram of a system for generating an open area map.

FIG. 1 shows one embodiment of a system 100 used for generating one or more open area maps. The system 100 includes, but is not limited to, an image source or sources 104, a network 108, a device 112, a network or connection 120, a database 170, a network 180, and a user device 116. Additional, fewer, or different components may be provided. For example, a proxy server, a name server, a map server, a cache server or cache network, a router, a switch or intelligent switch, a geographic database, additional computers or workstations, administrative components, such as an administrative workstation, a gateway device, a backbone, ports, network connections, and network interfaces may be provided. While the components in FIG. 1 are shown as separate from one another, one or more of these components may be combined.

The image source 104 is a website, an application, a program, a workstation or computer, a file, a memory, a server, a beacon or map beacon, a depository, and/or any other hardware and/or software component or database that can store or include images or data associated with images. Alternatively, the image source 104 is one or more images.

In one embodiment, the image source 104 includes one or more images of a layout. The images are raster or pixel based images, such as a JPEG, Bitmap, Pixmap, Tiff, or other pixel or raster based file format. The images may be raster or pixilated scanned copies of paper or hard layouts. Alternatively, the images may be vector based or vectorized images. Layouts may correspond to real-world areas in which a person, pedestrian, or people walk and/or move about. The layouts may also correspond to future real-world areas that have not been built yet. Alternatively, the layouts may correspond to imaginary locales, settings, or areas.

The layouts may represent an unorganized or unconstrained geographic area. For example, the layout is an area in which a pedestrian is not limited to travel only on a set road or path network. Rather, the pedestrian may walk through public plazas, parks, buildings, corridors, lobbies, or hallways having no associated road or path network or pattern. Additionally, the pedestrian does not have direction restrictions as a vehicle on a road. Moreover, the pedestrian has a greater degree of freedom of motion in the layout and may chose from a plethora of self-determined paths in any given open area.

The images of the layouts may include images of a real-world building floor plan, a parking lot, a park, an indoor or outdoor recreation area, and/or other interior and exterior area plans corresponding to places where a person can walk or move (e.g., via a wheel chair, a bicycle, or other mobile assistance device). The images are pre-existing or publicly available images. For example, the images are originally formed or created for purposes other than generating a routable map. The pre-existing images may be generated by an entity separate from a developer of a routable open area map and/or its end user. The pre-existing images are available to the public or an entity for free or for a purchase price (e.g., online). Alternatively, self-generated images, images originally generated for creating a routable map, or non-public images may be used.

The image source 104 is in communication with the device 112 via the network 108. The network is the Internet, an intranet, a local area network ("LAN"), a wide area network ("WAN"), a virtual private network ("VPN"), a local wireless or wired connection (e.g., a USB connection or other device connection), and/or any known or future network or connection.

The device 112 receives images of layouts from the image source 104 for generating routable open area maps. The device 112 is a workstation, computer, editing device, beacon or map beacon, and/or other computing or transmitting device. For example, the device 112 is an editing workstation. The device 112 includes, but is not limited to, a display 124, a processor 128, a memory 132, an application 134, and an input device 136. Additional, fewer, or different components may be provided. Audio components may be provided. For example, a speaker, audio jacks, and/or other components for outputting or receiving audible or sound signals are provided.

The display 124 is any mechanical and/or electronic display positioned for accessible viewing in, on, or in communication with the device 112. For example, the display 124 is a touch screen, liquid crystal display ("LCD"), cathode ray tube ("CRT") display, or a plasma display. The display 124 is operable to display images, such as images of layouts, floor plans, maps, or other areas. The input device 136 is a button, keypad, keyboard, mouse, trackball, rocker switch, touch pad, voice recognition circuit, or other device or component for controlling or inputting data in the device 112. The input device 136 may be used to perform functions, such as modifying received images (e.g., adding doors or openings) or using eraser tools.

The processor 128 is in communication with the memory 132, the application 134, the display 124, and the input device 136. The processor 128 may be in communication with more or fewer components. The processor 128 is a general processor, application-specific integrated circuit ("ASIC"), digital signal processor, field programmable gate array ("FPGA"), digital circuit, analog circuit, or combinations thereof. The processor 128 is one or more processors operable to control and/or communicate with the various electronics and logic of the device 112. The processor 128, the memory 132, and other circuitry may be part of an integrated circuit.

The memory 132 is any known or future storage device. The memory 132 is a non-volatile and/or volatile memory, such as a Random Access Memory "RAM" (electronic), a Read-Only Memory "ROM" (electronic), or an Erasable Programmable Read-Only Memory (EPROM or Flash memory).

A memory network may be provided. The memory 132 may be part of the processor 128. The memory 132 is operable or configured to store images of layouts received by the image source 104. The memory 132 may also store images or data generated by the processor 128.

The processor 128 is operable or configured to execute the application 134. The application 134 is a software program used to generate open area maps that are routable based on pre-existing images, such as the images received from the image source 104. For example, the processor 128 runs the application 134 and creates or generates or assists in generation of a routable map via input from the input device 136 and/or automated commands. The application 134 may be stored in the memory 132 and/or other memory.

The device 112 is operable or configured to send or transmit one or more generated routable open area maps to the user device 116, or the user device 116 may request a routable open area map via a network or connection 120. The connection 120 is the Internet, an intranet, a local area network ("LAN"), a wide area network ("WAN"), a virtual private network ("VPN"), a local wireless or wired connection (e.g., a USB connection or other device connection), and/or any known or future network or connection.

Alternatively, the device 112 may store, upload, or send one or more generated routable open area maps or data thereof to the database 170. The database 170 may be a database, a memory, a website, a server, a beacon, or other device used for storing, receiving, and/or transmitting data corresponding to the routable open area maps. For example, the database 170 may store data entities that represent different layers of the open area map, such as data corresponding to reference regions, cost, restrictions, a grid or array, image data, and/or other content. The user device 116 may obtain a routable open area map or data thereof from the database 170 via the network 180, such as without communicating with the device 112. The network 180 is the Internet, an intranet, a local area network ("LAN"), a wide area network ("WAN"), a virtual private network ("VPN"), a local wireless or wired connection (e.g., a USB connection or other device connection), and/or any known or future network or connection.

Also, routable open area maps may be "pushed" onto the user device 116. For example, beacons, map beacons, or other devices can transmit or send routable open area maps or related content to the user device 116 based on the location or position of the user device 116. In one embodiment, a beacon can be placed at an entrance or passageway of a building or other area, and once the user device 116 comes within a certain range of the beacon, a routable open area map associated with the area and/or other related areas is sent to the user device 116.

The user device 116 is used to operate one or more routable maps to allow a user to navigate in or on respective layouts or areas. The user device 116 is a cellular telephone, a mobile phone, a personal digital assistant ("PDA"), a watch, a personal navigation device ("PND"), a computer, a digital floor plan device, a portable or non-portable navigation device, a kiosk, and/or other fixed, removable, or transportable digital device. The user device 116 includes, but is not limited to, a display 140, a processor 144, and a memory 148. Additional, fewer, or different components may be provided. For example, audio and/or application components may be provided. Also, one or more clocks or components that keep track of time, such as real-world time of day, or interface or communicate with devices or systems (such as basestations or data towers) that provide time of day information may be provided. The display 140, the processor 144, and the memory 148 may be similar to or different than the display 124, the processor 128, and the memory 132, respectively.

In one embodiment, a user, such as a person working on a building floor, may want to be able to route or navigate about his or her building floor. Accordingly, an image of the layout or floor plan of the user's floor, which is stored in the image source 104, is transmitted and received at the device 112. Another entity, such as a map developer, operates the device 112. The map developer may be a person, company, or entity that develops maps for navigation or obtains and maintains map data and/or a geographic database, such as NAVTEQ North America, LLC located in Chicago, Ill. The map developer views the pre-existing image of the layout on the display 124 and generates a routable map based on the pre-existing image via the input device 136 and the software application 134. Automated commands and/or processes may be used in development of the routable open area map. Alternatively, the creation or generation of the routable open area map may be substantially entirely automated. The user may download or receive the routable map of his or her floor on the user device 116. For example, the user uses the user device 116 to download the routable map from the device 112 or a storage site or component associated with the device 112 (e.g., via the connection 120, such as a USB connection, a wireless connection, or other connection). Alternatively, the user may download the routable map on a device (e.g., a computer or a jump/thumb drive) different than the user device 116 and then transfer the data associated with the routable map to the user device 116 or other user device. The user then uses the device 116 to display the routable map for routing, guidance, and/or navigation purposes regarding the building floor.

Figure 2:
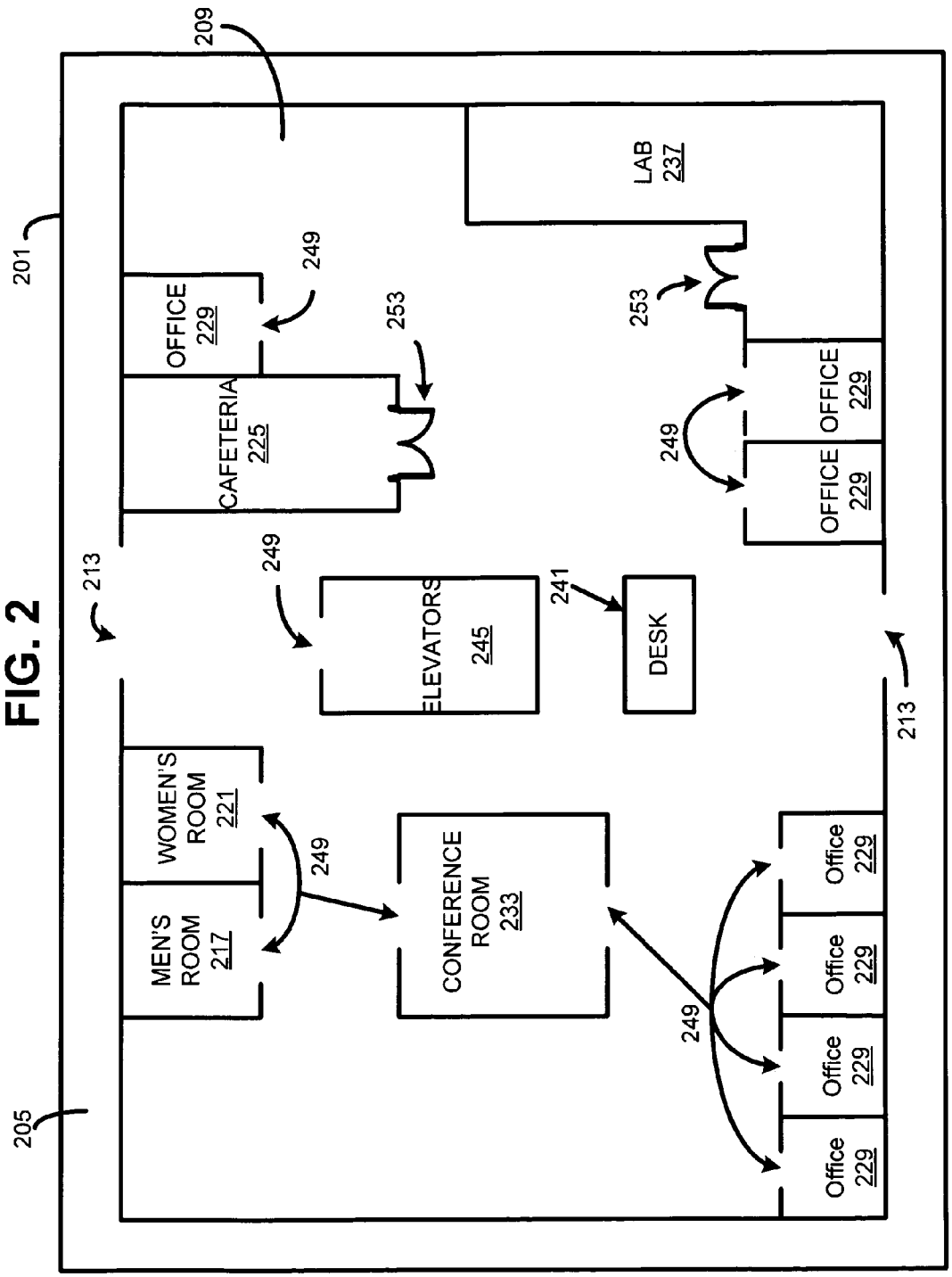
FIG. 2 is an image of a layout used in the system of FIG. 1.

FIG. 2 is one embodiment of an image 201 of a layout used in the system 100. The image 201 is a pre-existing or publicly available image (e.g., is associated with the image source 104 or other source) that can be downloaded from the Internet or other network. For example, the image 201 may be downloaded, received, obtained from a website or other source. The image 201 represents a real-world layout or floor plan of a building floor, such as a first floor or other floor. The image 201 includes graphical representations or icons of areas, spaces, and/or designations in the layout. For example, the image 201 includes image reference objects, such as a men's room 217, a women's room 221, a cafeteria 225, offices 229, a conference room 233, a lab 237, a desk 241, and elevators or elevator bank 245. Image representations of doors 249 are also provided. The doors 249 are shown as a gap or opening in respective image reference objects. Alternatively, a door may be represented using a door symbol or image object 253 rather than an opening. Or, there may not be a representation of a door or opening.

The image 201 also includes an image representation of an open space, a walking grounds, a common or public area, and/or a hall area 209 for people to walk or move about to get from one place to another on the floor. Walls or barriers are depicted by corresponding, associated, or contiguous pixels or lines (e.g., a heavy line) of substantially the same or similar color. Entrances and/or exits 213 are depicted as openings or gaps in the walls or barriers that allow access between the interior area 209 and an exterior area 205. The exterior area 205 may represent an outer hallway, an outside of the building (e.g., a sidewalk, street, or road), or other exterior environment.

Figure 3:
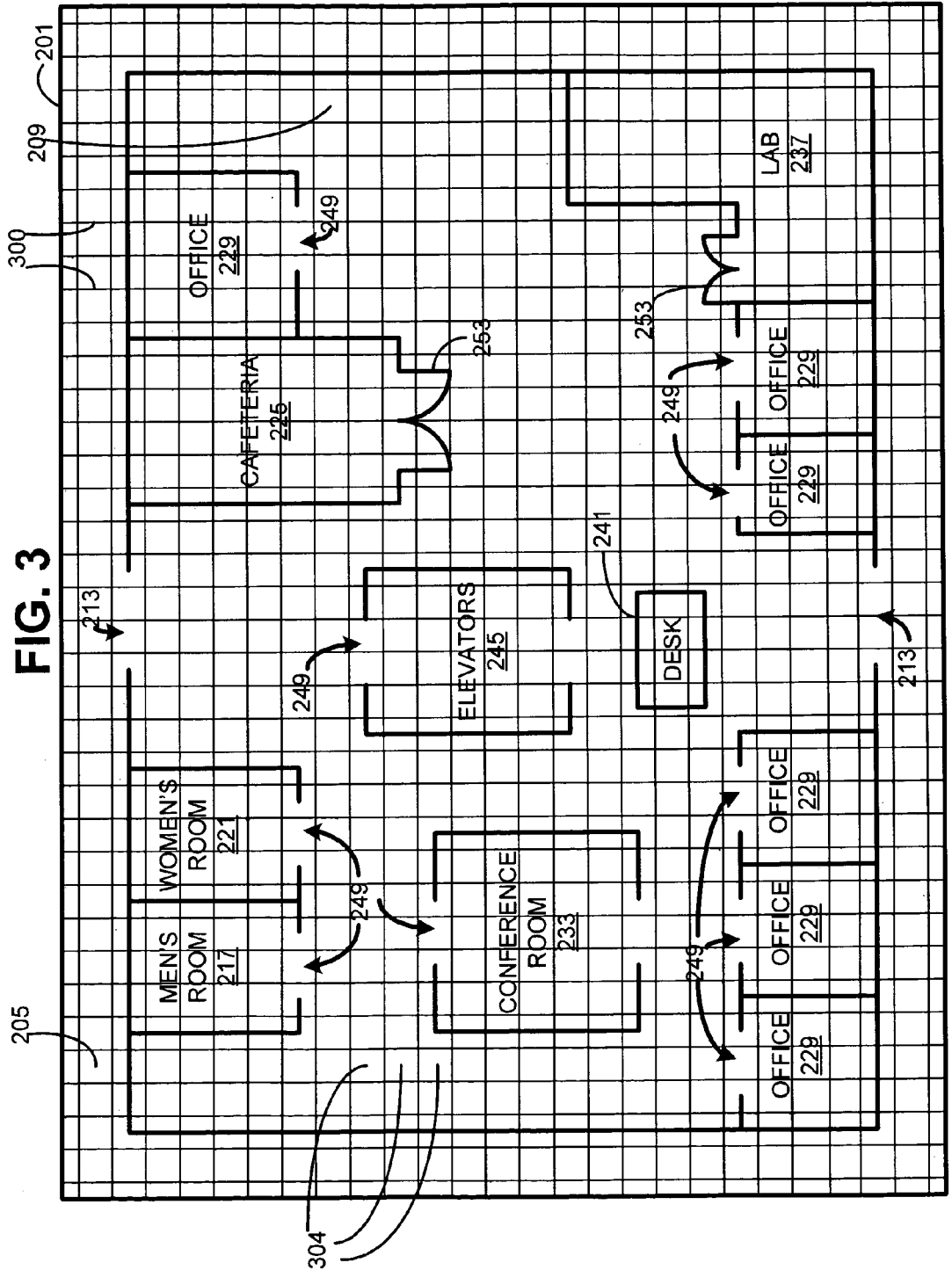
FIG. 3 is an image corresponding to a process used in the system of FIG. 1.

FIG. 3 is one embodiment of the image 201 corresponding to or undergoing a process used in the system 100 of FIG. 1. For example, the image 201 is downloaded or received at the device 112. The image 201 is used to create or generate an open area map that is routable. For example, a grid, mesh, or array 300 is applied on or over the image 201 or a copy of the image 201. The grid, mesh, or array 300 may be a grid or array of geometric shapes (e.g., uniform sized geometric shapes), such as tiles, sections, blocks, points, dots, circles, polygons, or other shapes. The grid or mesh 300 covers an entire ground area of the image 201. A ground area refers to a surface, plane, or floor or a portion thereof that can be walked upon as well as the surface in which objects or barriers may be placed or positioned on or over.

The grid or mesh 300 includes areas, sections, blocks, or tiles 304. Alternatively, the grid, mesh, or array 300 may include unconnected dots or points corresponding to areas or sections similar to the tiles 304 (e.g., the dots or points replace or act as a substitute for the tiles 304). The tiles 304 have a substantially rectangular or square shape and are substantially uniform in size. Alternatively, the tiles 304 may have a circular, triangular, or other geometric or polygon shape, and the tiles 304 may be different sizes at different locations rather than being uniform.

The grid 300 may be applied over certain areas of the layout rather than the entire image or entire ground area. For example, the grid 300 may be applied only in hallway areas, such as the interior area 209. In such as case, the grid 300 has a shape that corresponds to a pedestrian-accessible contiguous sub-area within the real-world area in which the shape has a boundary that corresponds to the walls in the pre-existing image. The grid 300 or portions thereof may also be applied to areas designated within an image reference object (e.g., the inner area of a room). Also, tiles may automatically fill into contiguous open areas. For example, a hallway or corridor area may be selected to automatically fill the area with tiles or sections of a grid or mesh.

The tiles 304 may be assigned or designated coordinates, such as local or global map coordinates. For example, each center of a tile 304 or other part of the tile is given a (x,y), latitude and longitude, or other coordinate designation. One of the tiles 304, such as at a corner of the image, may be designated as an origin point (0,0) for reference and positioning purposes. The coordinates allows items, features, or regions to be searchable. However, for routing purposes, the coordinates may not be used.

Figure 4:
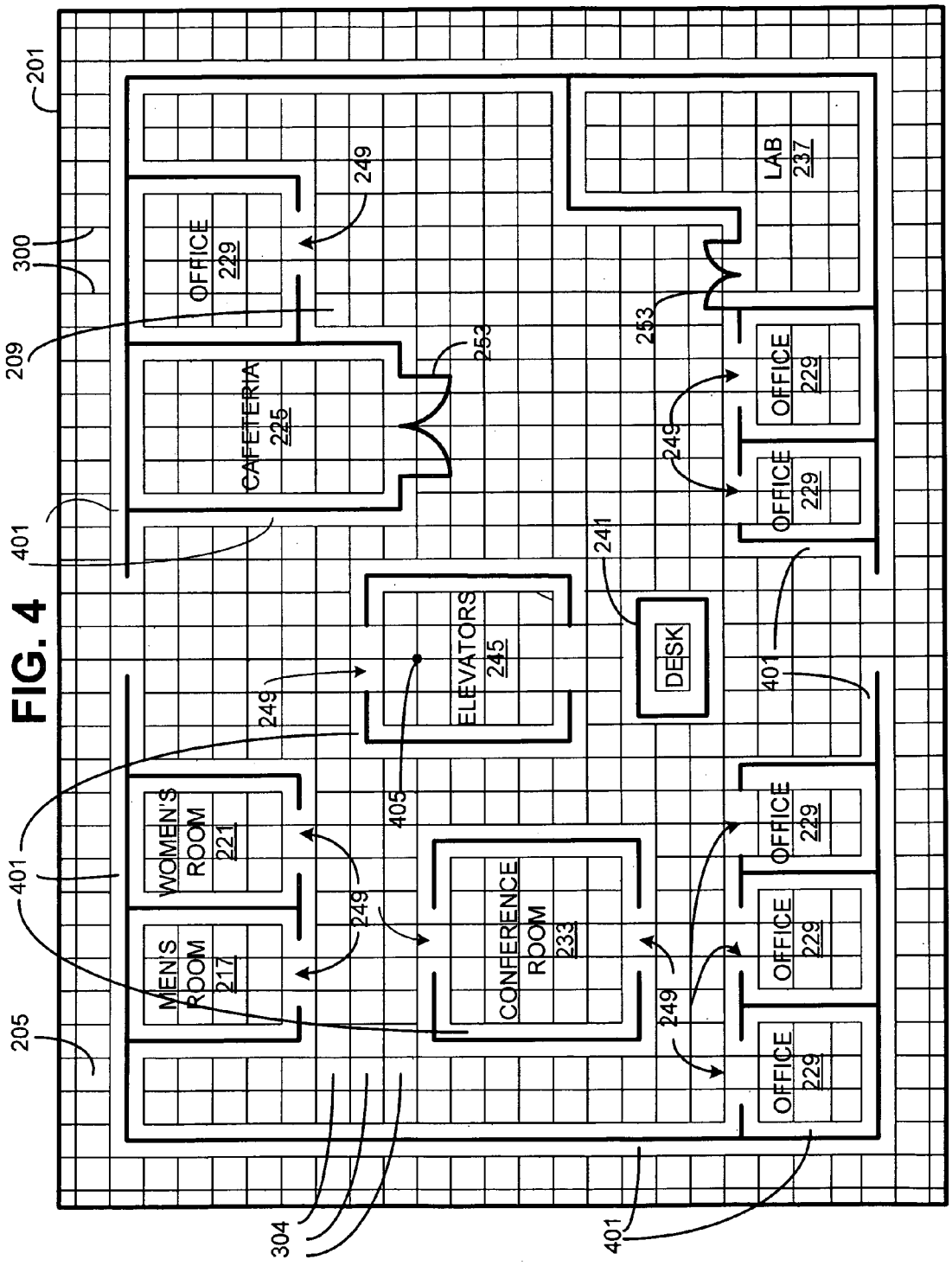
FIG. 4 is another image corresponding to another process used in the system of FIG. 1.

FIG. 4 is one embodiment of the image 201 corresponding to or undergoing another step or process after the mesh 300 has been overlaid. Tiles that are not to be walked on or that are non-navigable are provided as tiles or area 401 (e.g., the tiles or area 401 may be replaced with unconnected dots or points that represent non-navigable areas). For example, tiles surrounding or under or associated with borders or walls of the image reference objects (e.g., reference objects 217, 221, 225, 229, 233, 237, 241, and 245) are selected to be or are designated as non-navigable tiles 401. Also, the image representation of the border, barrier or wall between the interior hall area 209 and the exterior area 205 is associated with the non-navigable tiles 401 for routing purposes. The tiles 401 allow routes to be prohibited from passing through walls or barriers to represent a real-world experience. However, doors 249 and 253 are associated with navigable tiles 304 to allow routing in and out of rooms or areas surrounded by tiles 401. Alternatively, if no doors or openings are present or created, tiles substantially adjacent or proximate to reference areas may be used for routing to and from respective reference areas.

The non-navigable tiles 401 may be or represent tiles (or dots or points) removed from the grid 300 or may be tiles (or dots or points) designated with a non-navigable status. The non-navigable tiles 401 or the lack thereof may be represented as blank spaces, in which spaces that are free of the grid or tiles are not navigable for routing purposes. Alternatively, the non-navigable tiles 401 may be colored differently than the navigable tiles 304.

Navigable or non-navigable tiles, dots, or points may be sub-classified. For example, each or some tiles may be associated with a feature or location related to the layout. In one embodiment, tiles may be linked or correspond to a washroom area, a narrow area, a windowed area, a dimly lit area, a high traffic area, a low traffic area, or other area or feature. By classifying or sub-classifying the tiles, one can input preferences for routing purposes. For example, a user may want to avoid high traffic areas, and, accordingly, the user may input his or her preference before or during routing.

A wrap or boundary feature may be used regarding the grid 300. In certain cases, a person may want to route from one point in the interior area 209 to another point in the interior area 209, but a path is generated that routes the person out into the exterior area 205 and back into the area 209. Such routes may occur when it is optimum to route outside and back inside (e.g., when having multiple openings between interior and exterior areas). However, to avoid any routing to tiles in the exterior area 205, a wrap or boundary feature may be used that bounds all routing within the area 209 and associated areas. For example, a boundary line or designation may be allocated along the circumference of the inner area. However, the boundary feature will allow routing to the exterior area 205 when a user selects a destination point to be in the exterior area 205 or outside an inner area. Alternatively, the tiles of the exterior area 205 may be designated as non-navigable, or openings to the exterior area 205 may be associated with non-navigable tiles 401.

A connection point 405 is also provided. The connection point 405 may be generated or provided in a spatial or data layer separate from the grid or mesh 300. The connection point 405 is represented as a tile 304 or a subset of tiles 304 within an area. The connection point 405 may encompass the entire area of the elevators 245 or a portion thereof. Alternatively, the connection point 405 may not be associated with a reference image object or reference region. The connection point 405 represents or acts as a link to another map, such an open area map that is routable, for routing and navigation purposes. For example, the connection point 405 may correspond to one or more elevators, a stairwell, an escalator, a ladder, or other feature for moving a person to another floor or area. A plurality of connection points 405 may correspond to respective individual elevators or features. In one embodiment, the connection point 405 is used to route between an area or point from the image 201 to another point or area on another map or floor plan, such as another map or floor plan representing another floor of the building (e.g., a second floor, a third floor, or Nth floor). Alternatively, the connection point 405 may represent a connection for moving or transferring a person from one point to another point on the same floor or ground area. For example, the connection point 405 may correspond to a moving walkway or other transportation device. Also, the connection point 405 may represent a connection to another routable open area map associated with the same level or area. For example, in one open area map, a route may be generated to an area that is represented by a blank, unspecific, or general polygon or shape that represents a reference area, such as a food court. A connection point can be placed at, by, or on the general polygon that represents the reference area in which the connection point corresponds to or directs one to another routable open area map that has detailed features and/or reference regions within the original reference area (e.g., the food court).

Figure 5:
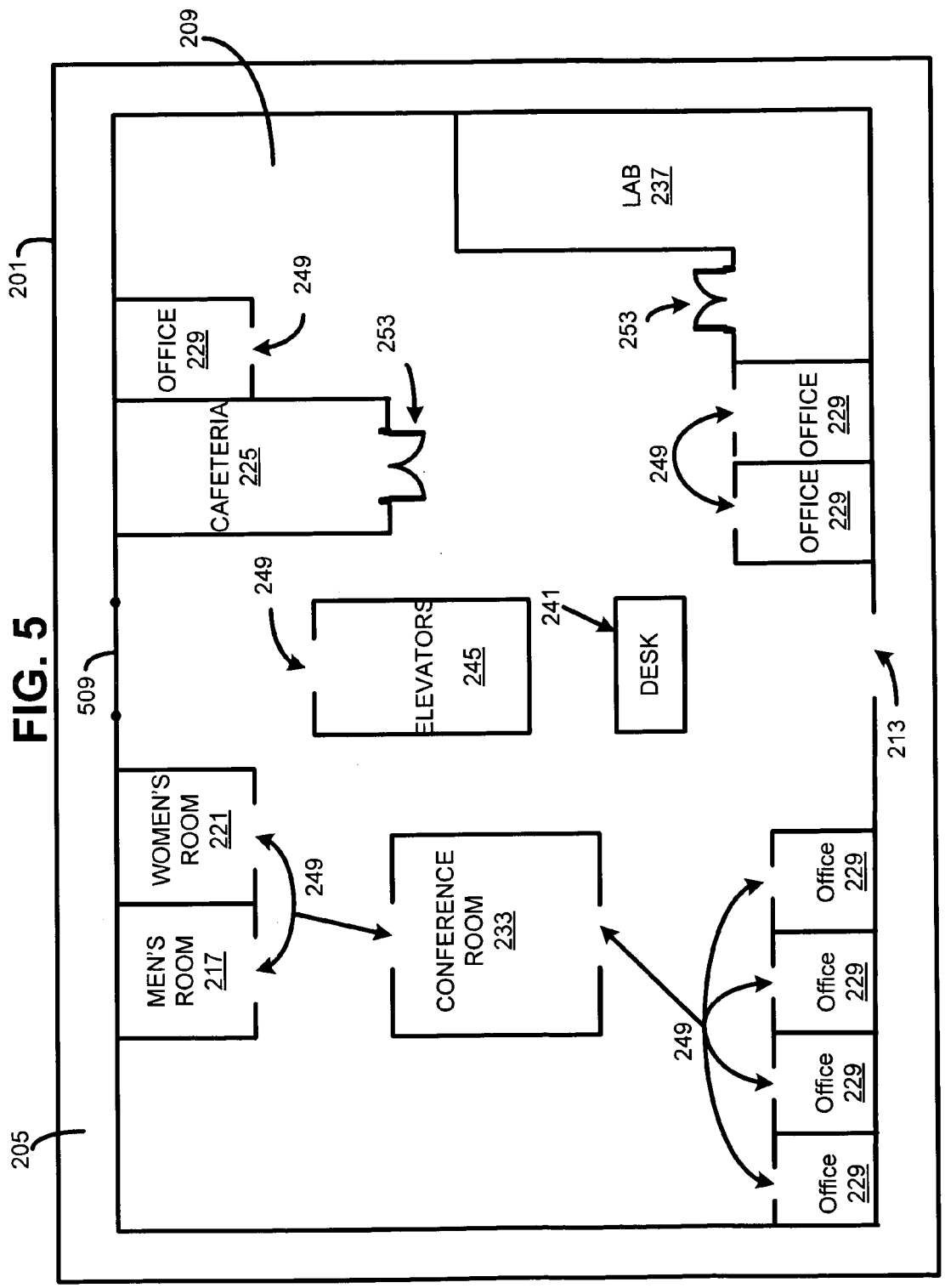
FIG. 5 is a diagram illustrating a restriction corresponding to the image of FIG. 2.

FIG. 5 is a diagram showing a restriction, condition, barrier, conditional barrier, or restriction barrier 509 that is associated with the image 201. The restriction 509 represents are real-world area, crossing, boundary, obstacle, and/or access/exit point that requires certain criteria or conditions to allow one to pass through. For example, the restriction 509 may correspond to a gate, a door, an opening, a connection (e.g., an elevator, an escalator, a moving walkway, a stairwell, or other connection), or other physical or non-physical barrier or restriction associated with a passageway. The restriction 509 may also correspond to features associated with a gate, a door, an opening, a connection, or a passageway. For example, the restriction 509 may represent or be associated with a key, a badge, a code, a retinal scan, or a finger print that is required to open a gate or door to pass through an area or point. Also, the gate, door, passageway, or connection may detect or depend upon a time of day, insertion or acceptance of a certain amount of money, and/or determination of weight, height, or other physical feature of a person and/or items associated with the person (e.g., a maximum or minimum height or weight) to allow and/or restrict passage.

Furthermore, the restriction 509 may correspond to a real-world conditional barrier in which the condition or criteria to allow passage is unidirectional. For example, a one-way conditional barrier or direction dependent restriction allows one to pass through or enter an area based on access authority (e.g., a badge or code), time, physical requirement, or other feature, but once the person has passed through or entered the area, the person may exit or pass through the barrier in another direction without meeting the criteria or conditions needed for the initial pass or entry. Alternatively, the direction dependent restriction may require different criteria than the initial criteria when passing through in a different direction.

To incorporate such restrictions in the routable open area maps, for example, the restriction 509 is drawn, generated, or formed as a line having a length that covers an associated passageway. Other geometric shapes, symbols, or icons may be used when generating the restriction 509. The line is orientated or corresponds with underlying tiles or objects (e.g., the restriction 509 may be compiled with the grid 300 in which the restriction 509 is associated with at least one tile corresponding with a gate, an opening, a door, or a connection). Alternatively, the restriction 509 may be formed or created by associating or designating restriction data or criteria/conditions thereof to an existing image, icon, or graphical representation present in the image 201 (e.g., a symbol or icon of a door, elevator, stairs, or gate) or to respective tile or objects of the grid 300.

The restriction 509 may be drawn, formed, or generated in a spatial data layer that is separate from the grid 300 or the underlying image 201. When creating the restriction 509, the grid 300 or the image 201 may be viewed for orientation and association purposes, but the restriction may still exist in a separate spatial layer. The restriction 509 may also be in a separate or different spatial layer than the reference regions 500, described below, and/or any other components, data, or features that are to be later compiled to form a routable open area map. Alternatively, the restriction 509 may be generated or exist in the same spatial layer as the grid 300, the reference regions 500, and/or other open area map components or content.

The restriction 509 covers or corresponds to an entrance/exit, passageway, or connection associated with the layout of the image 201. For example, the entrance/exit may be a gated passageway or door that requires a badge or other access authority to pass through, or the gate depends on a time of day in which access through is only possible for a certain time period (e.g., 9:00 AM to 6:00 PM). In contrast, the front opening or door 213 may not require such access authority, and, therefore, is not associated with a restriction.

Figure 6:
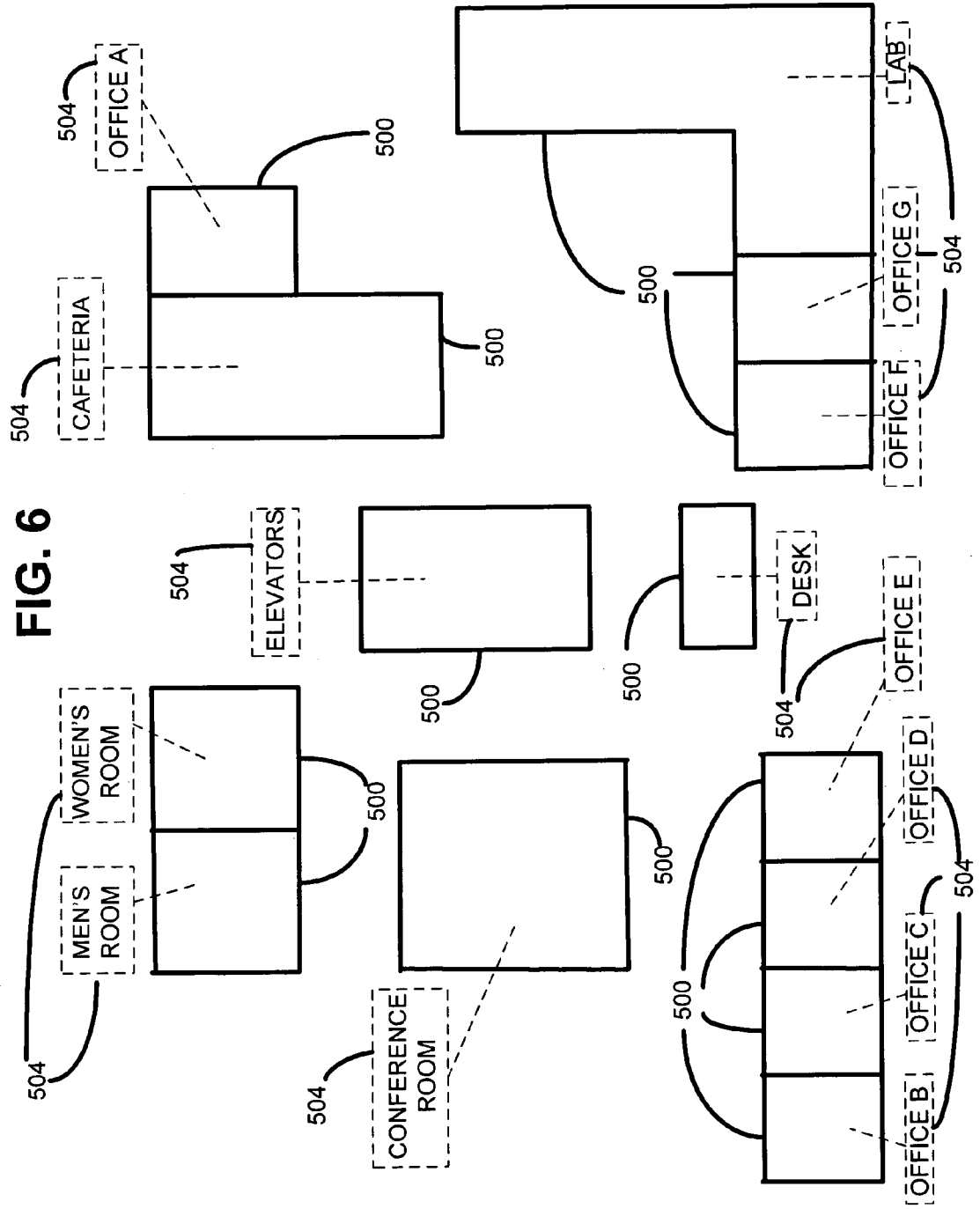
FIG. 6 is a diagram illustrating reference regions corresponding to the image of FIG. 2.

FIG. 6 is a diagram showing reference regions 500 corresponding to the image 201. In a spatial layer separate from the grid 300, the reference regions 500 are generated. For example, the image reference objects 217, 221, 225, 229, 233, 237, 241, and 245 in the image 201 are part of a raster image or a pixilated image. The raster image may be binarized (e.g., converting pixels to black and white pixels and/or 1's and 0's). The device 112 extracts names or descriptions associated with the image reference objects. The separation allows for facilitation of optical character recognition ("OCR") to generate text 504 corresponding to the names or descriptions associated with the raster image 201. The text 504 is used for searching or associating different areas of an open area map. The text 504 may match the names or descriptions of the image 201. Alternatively, additional or different text or information may be added. For example, text "A," "B," "C," "D," "E," "F," and "G" are added to the "office" text for differentiation purposes. The added text may or may not be visible to an end user.

After graphics-text separation, the image reference objects go through vectorization to form the polygons, reference regions, or areas 500. The reference regions 500 correspond to the different areas, rooms, or spaces in the image 201. The reference regions 500 are associated with or correspond to respective navigable tiles 304 and respective non-navigable tiles 401 represented by the grid 300 on a different spatial layer.

The grid or mesh layer may be compiled with the reference region layer, a connection layer, and/or other spatial or data layers, such as a cost layer or restriction layer (e.g., the restriction 509), to form or generate an open area map that can be used for navigation and/or routing.

Figure 7:
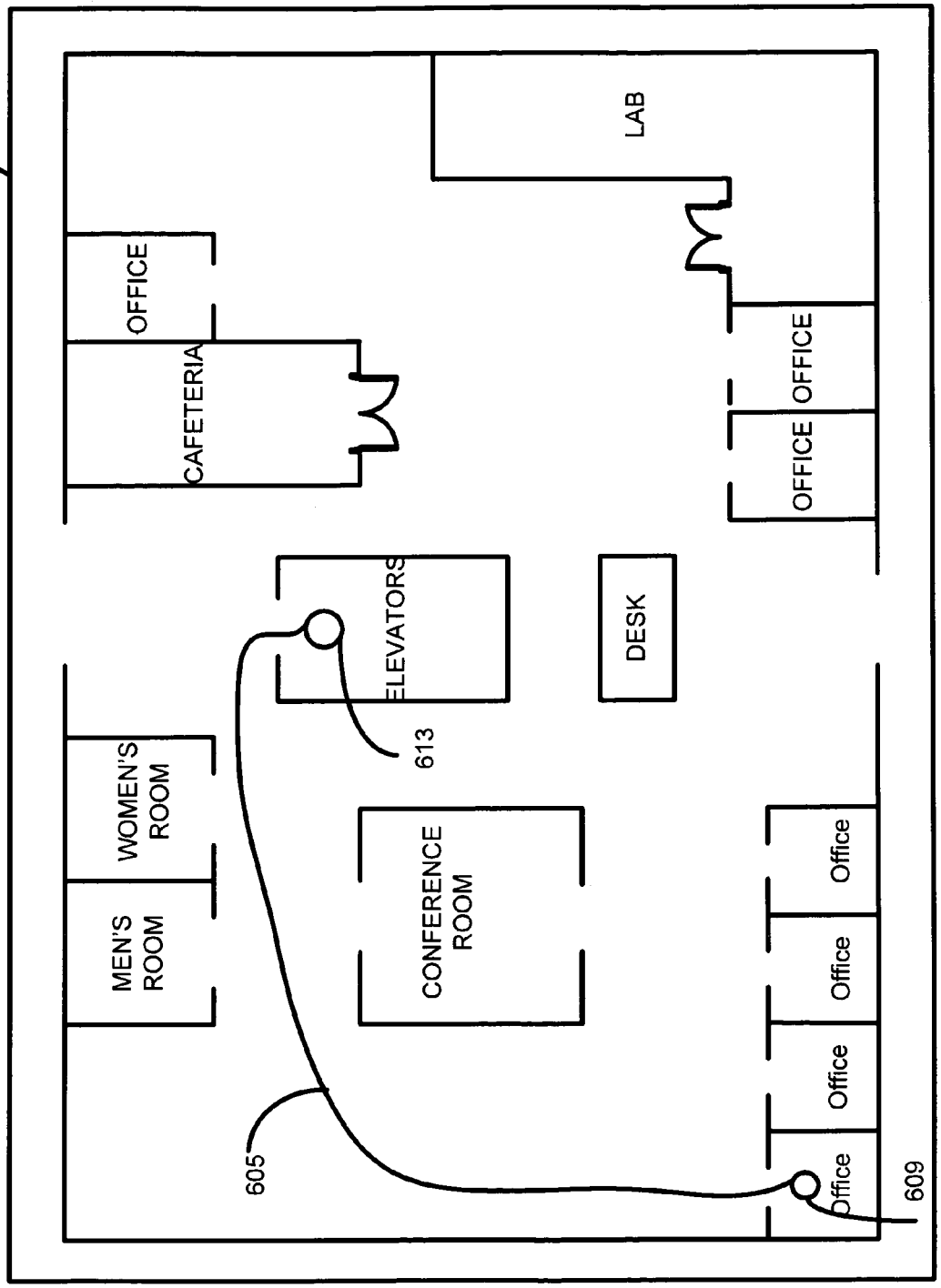
FIG. 7 is an image of an open area map generated by the system of FIG. 1.

FIG. 7 shows one embodiment of an open area map 601 generated by the system 100 of FIG. 1. The open area map 601 may be displayed on the display 140 of the user device 116 or other display. The open area map 601 includes graphical representations of the reference image objects of the image 201. For example, the image 201 is used as a background or base image for the open area map 601. Alternatively, different graphics or images are generated (e.g., based on the generation of the reference regions 500) to represent the original layout of the image 201. The grid 300, including the navigable tiles 304 and the non-navigable tiles 401 or lack thereof, compiled with the reference regions 500 and the connection point 405 underlie the open area map 601 for routing and navigation purposes. For example, the grid 300 or compiled grid may not be seen by a user. Alternatively, the grid 300 and/or other features may be exposed to the user.

Figure 8:
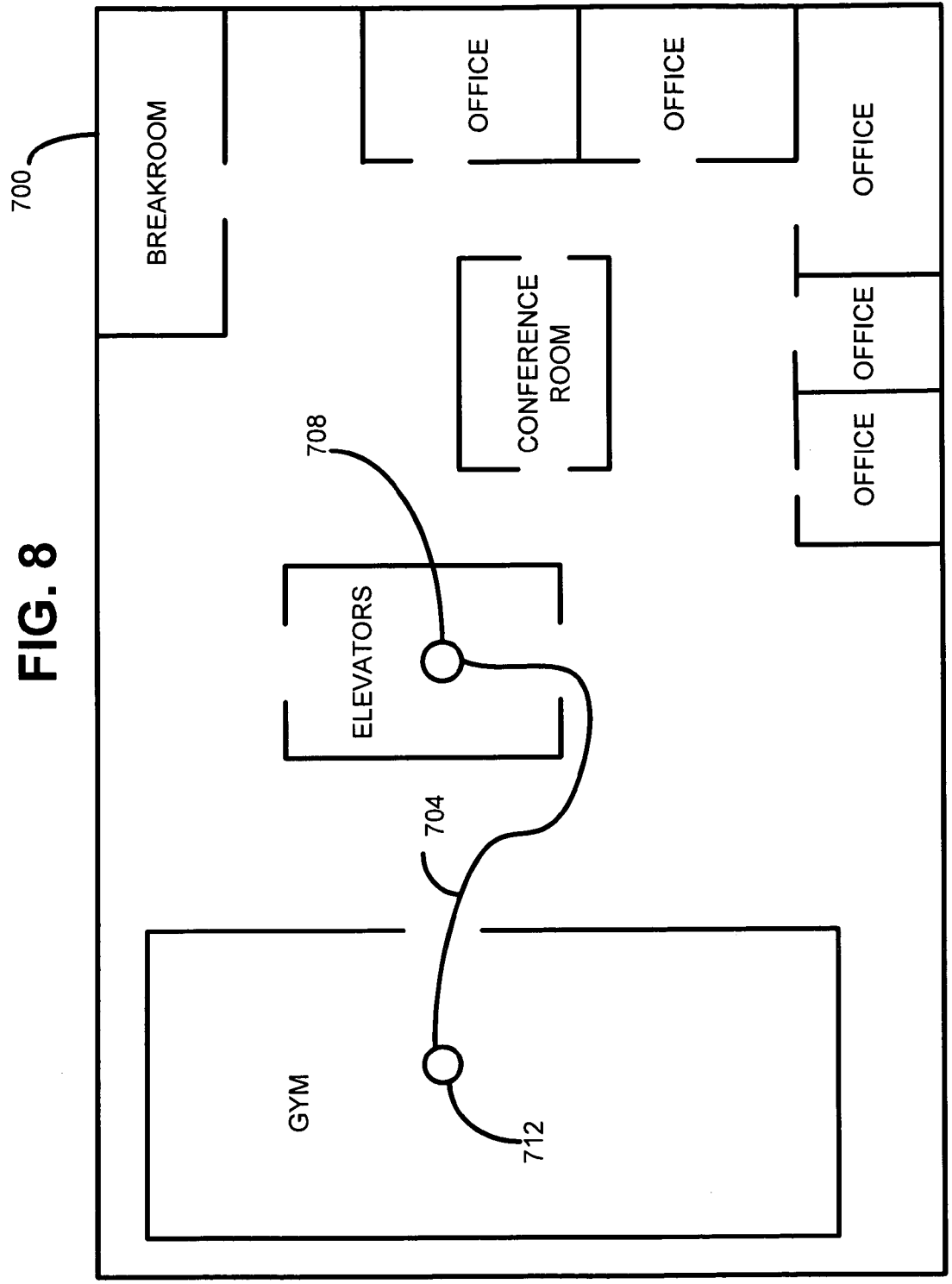
FIG. 8 is another image of another open area map generated by the system of FIG. 1.

FIG. 8 shows one embodiment of an open area map 700 generated by the system 100 of FIG. 1. The open area map 700 represents another floor of the building that includes the floor represented by the open area map 601. The open area map 700 includes image reference objects, such as a breakroom, a conference room, elevators or elevator bank, offices, and a gym, as well as associated reference regions, a grid, a connection point 708, and navigable and non-navigable tiles similar to the respective features of the open area map 601 discussed above.

In one embodiment, a user may want to use the open area maps 601 and 700 to route from an office on one floor to the gym on another floor of the building. Referring to FIG. 7, the user searches for the office, using a text search, to designate an origin point 609. The text for the particular office is associated with the respective reference region 500, which is associated with respective tiles 304 and 401. Alternatively, the user physically touches or selects the origin point 609 on the display. Or, the origin point is determined based on a global positioning satellite ("GPS") system or device, an indoor location system (e.g., WiFi based), or the fact that the location of the origin point is fixed (e.g., a kiosk or a floor plan device on a wall). The origin point 609 may correspond to one or more tiles within or associated with the reference region or reference image object of the office or may correspond to the entire area. Referring to FIG. 8, the user then searches for the gym, using a text search, to designate a destination point 712. The text for the gym is associated with the respective reference region for the gym, which is associated with respective tiles. Alternatively, the user physically touches or selects the destination point 712 on the display. The user may switch to the open area map 700 or may view both open area maps 601 and 700 on the same screen or window.

After the origin point 609 and destination point 712 are selected, various routes are calculated and/or compared based on the underlying compiled grid. The routes may be calculated based on a Dijkstra method, an A-star algorithm or search, and/or other route exploration or calculation algorithms. Various aspects, such as distance, non-navigable areas, costs, and/or restrictions, are considered to determine an optimum route. A path 605 (FIG. 7) is generated based on the calculation. The path 605 is displayed for the user to view and follow. The path 605 shows a path that starts from the origin point 609 in the office, passes the conference room, and uses the elevators via a connection point 613, such as the connection 405. Then the open area map 700 shows a path 704 (FIG. 8) that starts from elevators at a connection point 708 and leads to the gym at the destination point 712.

The calculation and determination of the routes and/or the paths 605 and 704 are based on or formed of adjacent, continuous, or connected tiles. For example, navigable tiles that border or touch each other are considered for point-to-point routing, in which any area in the layout or any point associated with adjacent tiles can be routed to based on calculation regarding the grid or mesh (i.e., not solely pre-determined routes). Adjacent tiles forming a route may be connected or linked by their center points or other parts.

Figure 9:
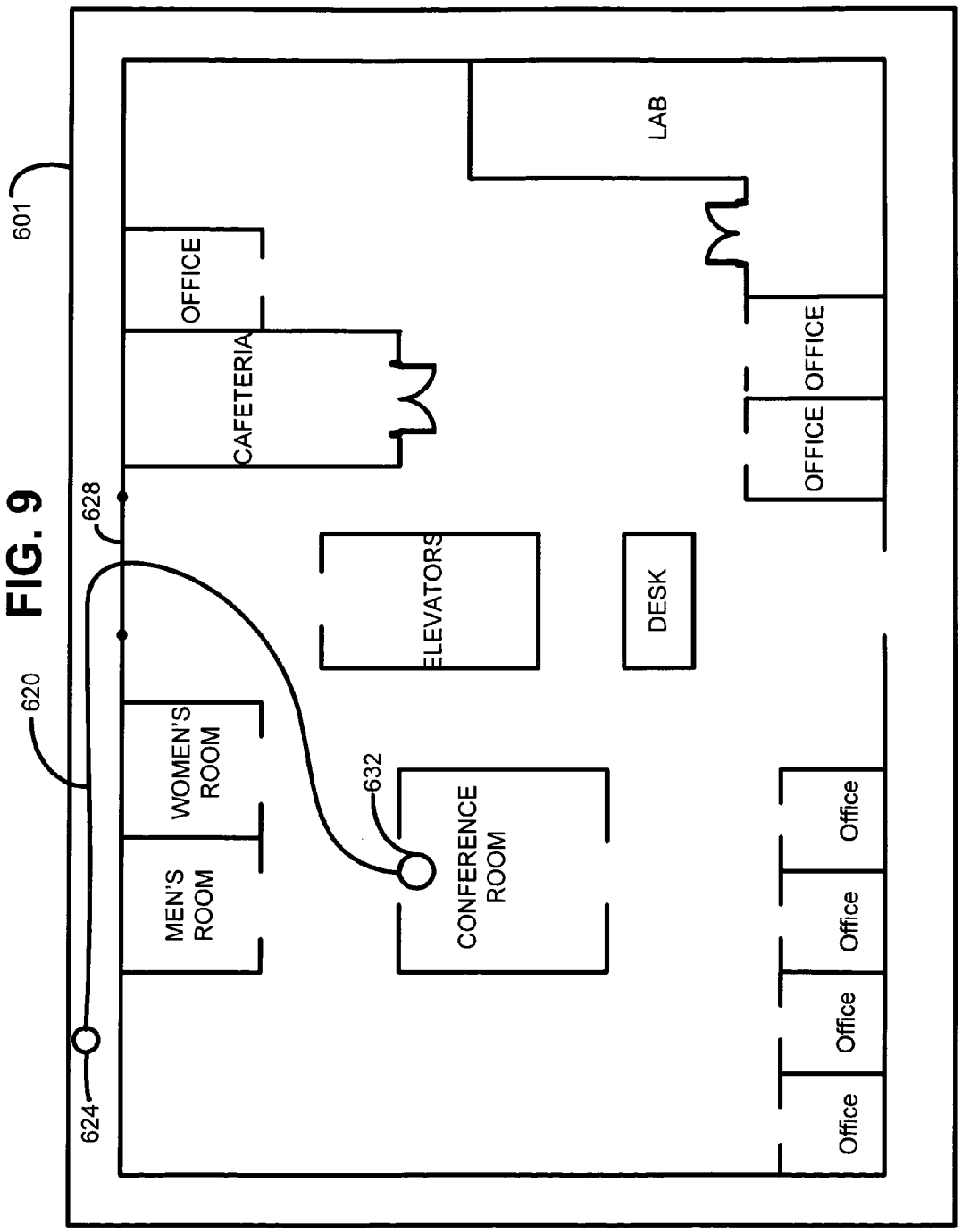
FIG. 9 is an image of an open area map enabled with a restriction generated by the system of FIG. 1.

FIG. 9 shows one embodiment of the open area map 601 having a restriction feature enabled or turned on (e.g., the restriction 509 is taken into consideration for routing purposes). For example, a user selects an origin point 624 (or the origin point 624 is automatically selected) as well as a destination point 632, which relates to a conference room area. A route is calculated and a path 620 from the origin point 624 to the destination point 632 is generated and displayed. The path 620 passes through the restriction area associated with the restriction 509 (FIG. 5). A restriction image, icon, or graphical representation 628 is also displayed or shown. The restriction image 628 may be different or the same as the generated restriction 509. The restriction image 628 may identify whether or not the restriction is a one-way or a directional dependent restriction (or other indications may be used to identify directional dependent restrictions). Alternatively, the restriction image 628 may not be displayed (e.g., just an opening, gap, or other symbol associated with the underlying image may be shown). The restriction image 628 or the underlying tiles or objects may be highlighted, flash, glow, blink, or demonstrate a visual indication letting a user know the path passes through a restriction or conditional barrier.

The full path 620 may be generated and displayed based on prior user input. For example, before routing, the user entered or inputted criteria or information corresponding to the restriction 509. The criteria may include physical information, authorization information, monetary information, and/or other information. For example, the user may input his or her height, weight, how much money he or she has on his or her person, whether or not he or she has a badge, knows a code, or has authorization for certain areas in the layout, a time of day he or she plans on moving or walking from the origin to the destination, or other criteria. Based on the user information, the open area map 601 determines whether or not the user may pass through the restriction or barrier. This determination may take place during, before, or after route calculation. Accordingly, the path 620 may be generated and displayed to navigate the user to the destination point 632 without inconvenience.

Figure 10:
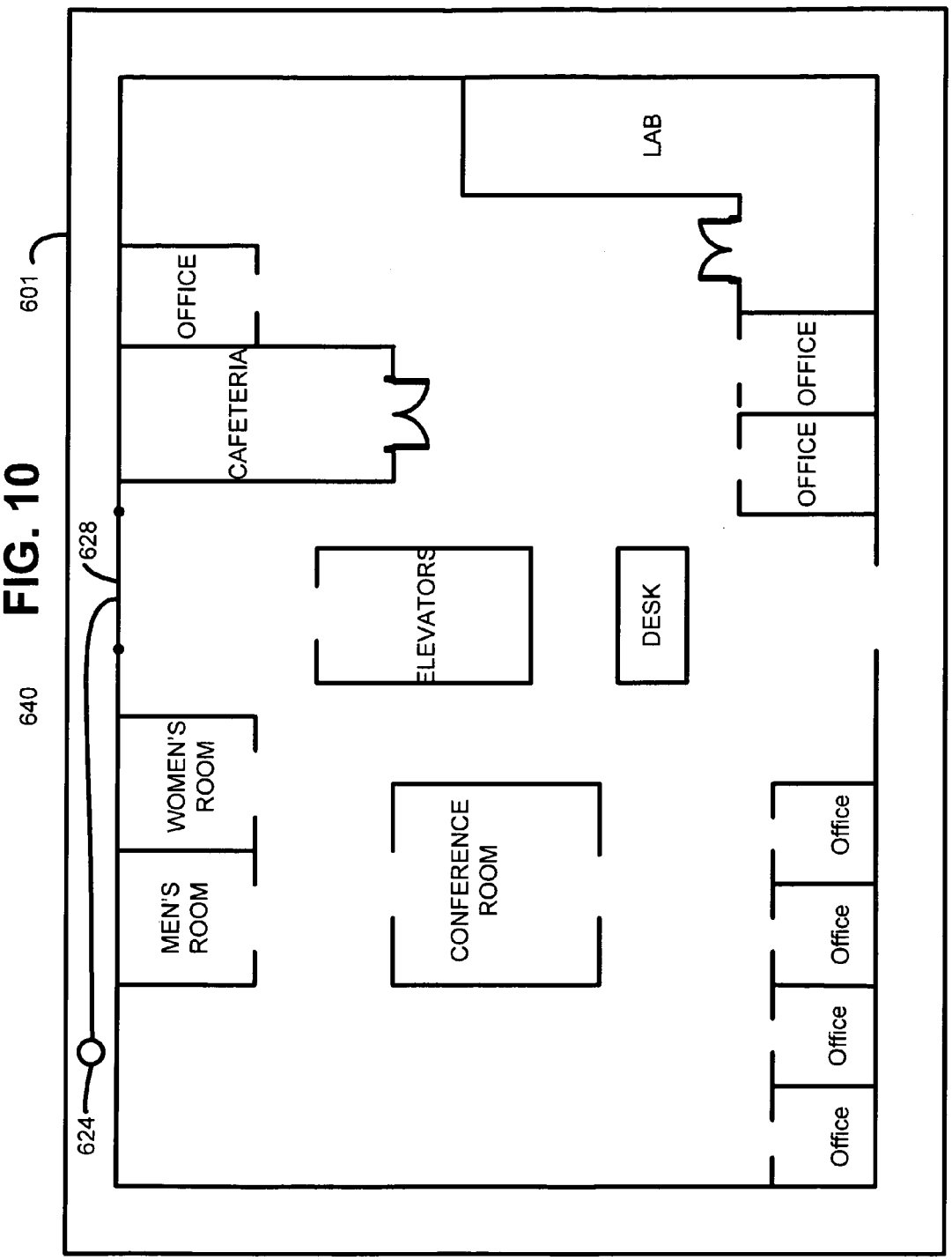
FIG. 10 is an alternate image of the open area map of FIG. 9.

FIG. 10 shows an alternate embodiment of the open area map 601 having a restriction feature enabled or turned on. For example, a user wants to route from the origin point to a selected destination beyond the restriction area, such as the conference room. A path 640 from the origin point 624 to the restriction image 628 or restriction point is generated and displayed. At this point, the open area map 601 may prompt the user to decide whether or not to route through the restriction and/or re-route around the restriction (e.g., through audio or visual display). The user may know he or she does or does not have access, can pass through, or whether he or she forgot his or her badge. Alternatively, the open area map 601 may ask the user or inquire about criteria or information to pass through the restriction. For example, an audio or voice output may ask for user information or a text box may be displayed (e.g., a separate screen or window may be displayed asking for user criteria or text within the same window or screen of the underlying image may appear). The user may input his or her information via an input device (e.g., through speech, audio content, text, or selection of choices displayed or given). Based on the received input, the open area map decides or determines if the user information meets the criteria for passing the restriction. If the criteria is met, a complete of full route or path is calculated, generated, and/or displayed from the origin point to the selected destination, such as the path 620 (FIG. 9). Alternatively, the full path or no path may be displayed before the user is prompted for criteria information. If the criteria is not met, a different route is calculated that circumvents or bypasses the restriction, if possible.

Figure 11:
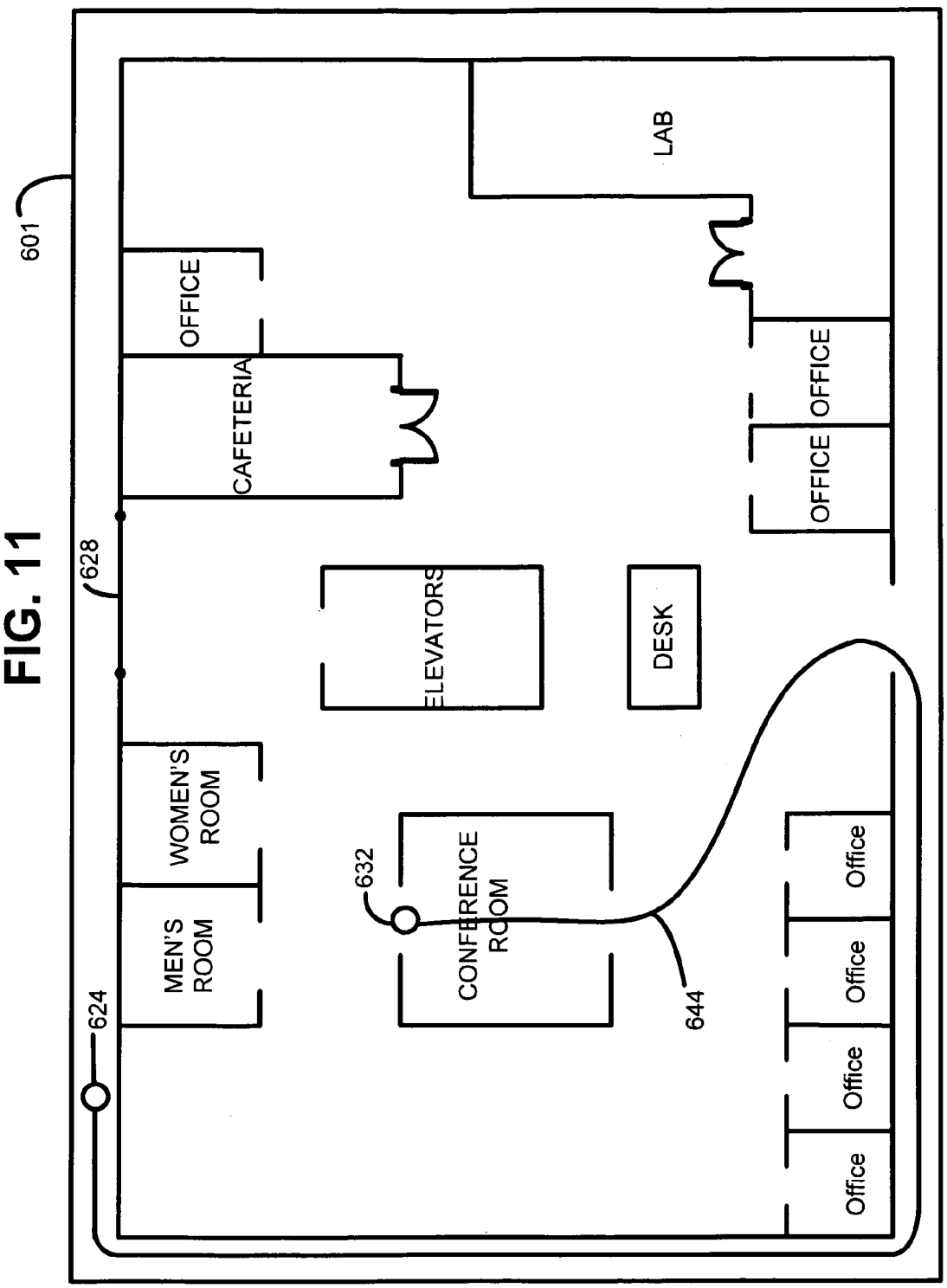
FIG. 11 is another alternate image of the open area map of FIG. 9.

FIG. 11 shows another alternate embodiment of the open area map 601 having a restriction feature enabled or turned on. For example, if user information does not meet the criteria for passing through the restriction or restricted area, a route to the selected destination point 632 is recalculated. A path 644 from the origin point 624 to the destination point 632 circumvents the restriction image 628 or restriction by directing the user around the interior portion of the open area map to a front or other entrance/exit (which does not have a restriction) and to the destination point 632. Alternatively, the path 644 may start at the restriction image 628 or other point that is different than the origin point 624.

Figure 12:
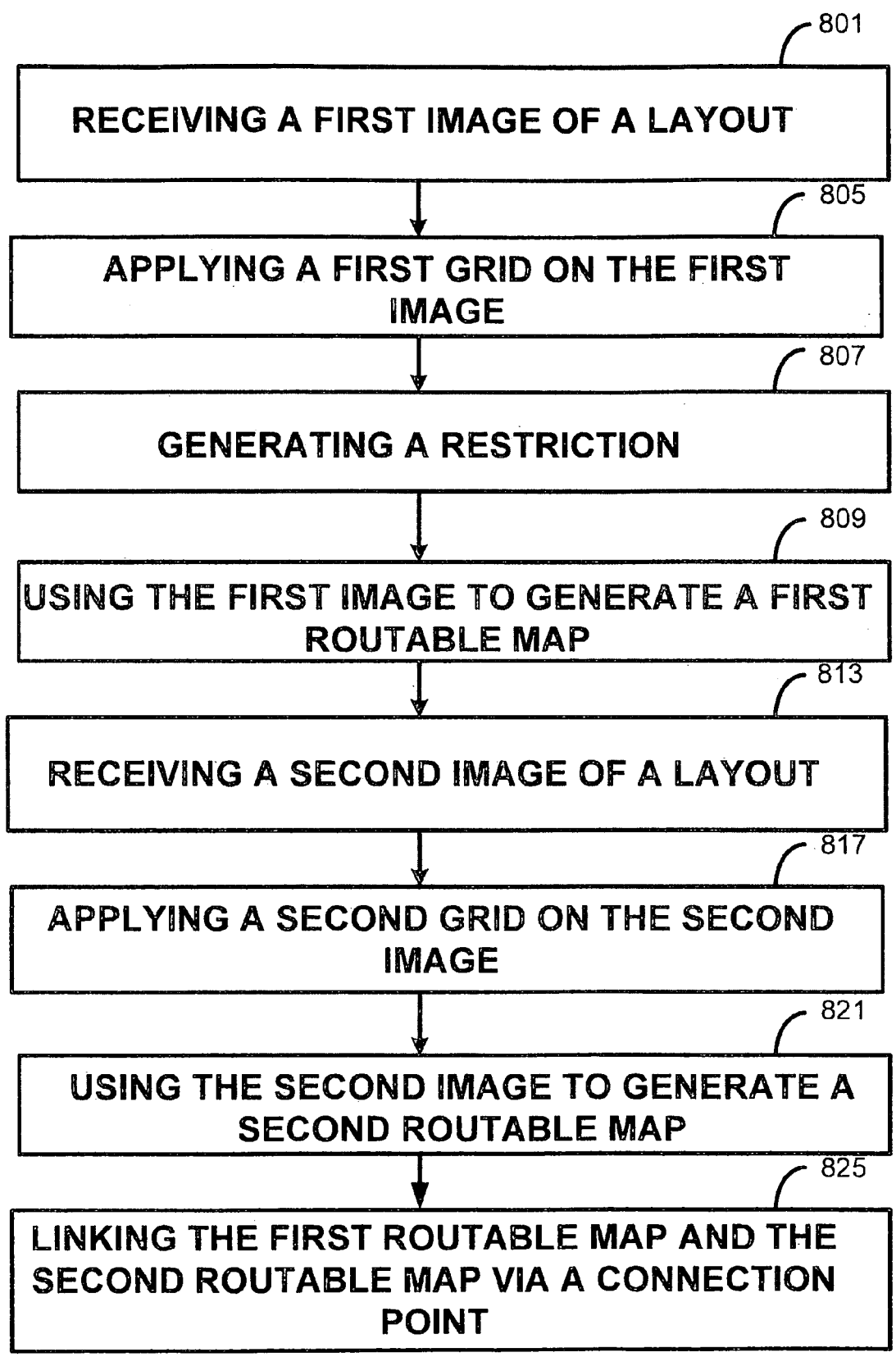
FIG. 12 is a flowchart of a method for generating an open area map.

FIG. 12 is a flowchart of a method for generating an open area map, such as the open area map 601 or 700. Fewer or more steps or acts may be provided, and a combination of steps may be provided. Also, the steps or acts may be performed in the order as shown or in a different order. The method is implemented by the system and/or devices described herein or by different devices or systems.

In one embodiment, a graphical representation or an image of a layout, such as the image 201, is obtained or received (Step 801). For example, a map developer using a workstation, computer, or other device, such as the device 112, downloads or requests a pre-existing image of a layout, such as a building floor plan, via the Internet or other network or connection, such as the network 108. The graphical representation of the image may be stored or located at a website, server, file, another computer or other device, or any other storage device or area, such as the image source 104. The image of the layout may be received wirelessly and/or through a wired connection. The received image may be modified. For example, eraser or drawing tools or functions may be provided so that the map developer can add or remove image features. In some cases, doors or openings may need to be added for routing purposes.

A grid, mesh, or array, such as the grid or array 300, is applied or overlaid on or over the image of the layout, a copy of the image of the layout, or a modified image of the layout (Step 805). The map developer assigns a scale by designating a distance measurement within the layout. For example, using a mouse or other input device, such as the input device 136, the map developer selects a space or distance between image objects, such as the image objects 217, 221, 225, 229, 233, 237, 241, and 245, representing a width or length of a hallway or area. The map developer then assigns a value to that space or distance, such as 1 meter or 3 meters. Alternatively, designating a distance measurement may be entered via a "pop-up" screen or a fill-in box, or the distance measurement may be automatically implemented based on pre-existing distance markers in the image or pre-determined parameters. By assigning a scale, an understanding of distances between objects and areas within the layout is achieved.

The grid or mesh is then applied on the image of the layout, or the grid or mesh is applied before assigning the scale. For example, a grid covering substantially the entire image of the layout is provided. Alternatively, certain or specific portions are chosen for applying the gird. In one embodiment, the grid may be applied to only areas designated for walking between reference objects, such as hallways or other ground or open areas. Therefore, the grid or mesh does not intersect borders, barriers, and/or walls within the image. Also, the grid or mesh may be applied on internal areas, such as areas within a room or image reference object. The map developer may choose where to apply the grid, portions of the grid, or multiple grids that may be joined via the input device. For example, the map developer may click on or select a hallway area within the layout to apply a grid throughout the hallway area. In alternate embodiments, a grid or a portion thereof is automatically overlaid over substantially the entire image of the layout or portions of the layout based on color/image recognition or other parameters.

The grid, mesh, or array is composed of tiles, blocks, sections or areas, such as the tiles 304, or similar or corresponding dots or points, as mentioned above. Based on the scaling, the tiles are assigned or correspond to a measurement value. For example, each tile may have a measurement value of about 1 square meter, ¼ square meter, or other value. Alternatively, each tile may have any other measurement value or different values from each other. The resolution or number of tiles or points may be adjusted by the map developer or automatically. For example, for a finer resolution, the grid or mesh may be adjusted or changed to include more tiles or points, and for a lower resolution, the grid or mesh may be adjusted to include fewer tiles or points. The adjustment of the number of tiles or points may be based on the number or positioning of image reference objects within the layout and/or other factors. For example, the size of the tiles may be selected to match a human or pedestrian scale so that at least one navigable tile may fit in narrow or narrowest passages in the real world environment. A maximum tile size (e.g., at most about 15, 20, or 30 inches in length and/or width or other length, width, dimensional, and/or area value) may be chosen or be pre-determined to allow for navigable tiles to be placed in the narrowest or smallest areas, hall, or corridors for routing. An appropriate tile or area size is chosen to avoid the lack or inability of routing in some suitable areas of the layout. Also, non-uniform sized tiles and/or shapes may be used for different areas. For example, larger areas may use larger sized tiles and smaller or narrow areas may use finer or smaller sized tiles.

Local or global map coordinates are assigned or designated. For example, center of the tiles or other parts of the tiles (or points or dots of an array or grid) are given a (x,y), latitude and longitude, or other coordinate designation. An origin is selected by assigning a (0,0) or origin point to one of the tiles (e.g., a corner tile). The coordinates can be used for searching or identifying reference image objects, reference regions, or other features or vice versa. Point-to-point routing may, however, be based on adjacent or contiguous tiles, and, therefore, the coordinates may not be needed for routing calculations. Alternatively, the coordinates may be used for distance and cost determinations when calculating a route.

A restriction or conditional barrier, such as the restriction 509, is generated or created (Step 807). For example, a map developer may generate one or more conditional barriers associated with real-world restricted areas or passageways. The conditional barriers are formed in a data or spatial layer that is separate from the grid, the reference regions, or other components to be compiled. Alternatively, the conditional barriers may be a part of or exist in common layers (e.g., part of the grid or array layer). In one embodiment, a line is drawn or formed to cover a width of a passageway that corresponds to a door, opening, gate, connection, or other point in the layout that is associated with a restriction or conditions that govern the ability to pass through the area, such as physical (e.g., height and weight) limitations, monetary limitations, temporal limitations, or other limitations, conditions, or restrictions. The line may be restricted directionally so that passage in one direction may be restricted (or both directions may be restricted). The line or conditional barrier may be drawn or generated while viewing the underlying image, such as the image 201, or a grid, such as the grid 300. Alternatively, the conditional barrier may be any other shape or symbol, or the conditional barrier may be one or more tiles or objects and/or icons or graphical representations in the underlying image that are designated as restrictions.

The conditional barrier or restriction may be generated automatically or semi-automatically by identifying gates, doors, or other features in the original image (e.g., a symbol of a keycard gate or a monetary or money booth) as well as restriction requirements or criteria that may be graphically shown in the original image (e.g., how much money is required to pass the booth or area). Such automatic or semi-automatic generation may involve graphics-text separation and/or OCR.

Manual and/or automatic or semi-automatic generation of the restriction or conditional barrier may require input from the map developer or other entity. For example, the criteria or conditions associated with the restriction may be designated or entered. In one embodiment, a maximum or minimum height, weight, other physical feature, direction dependent features, a certain amount of money, time of day or time range or period may be designated to the restriction. Accordingly, the restriction allows a route or path to be calculated and/or generated through itself if user information meets such criteria or conditions. The criteria may be entered by typing or inputting text, by voice recognition, by selecting from a pre-determined list or category of options, and/or other input means.

Figure 13:
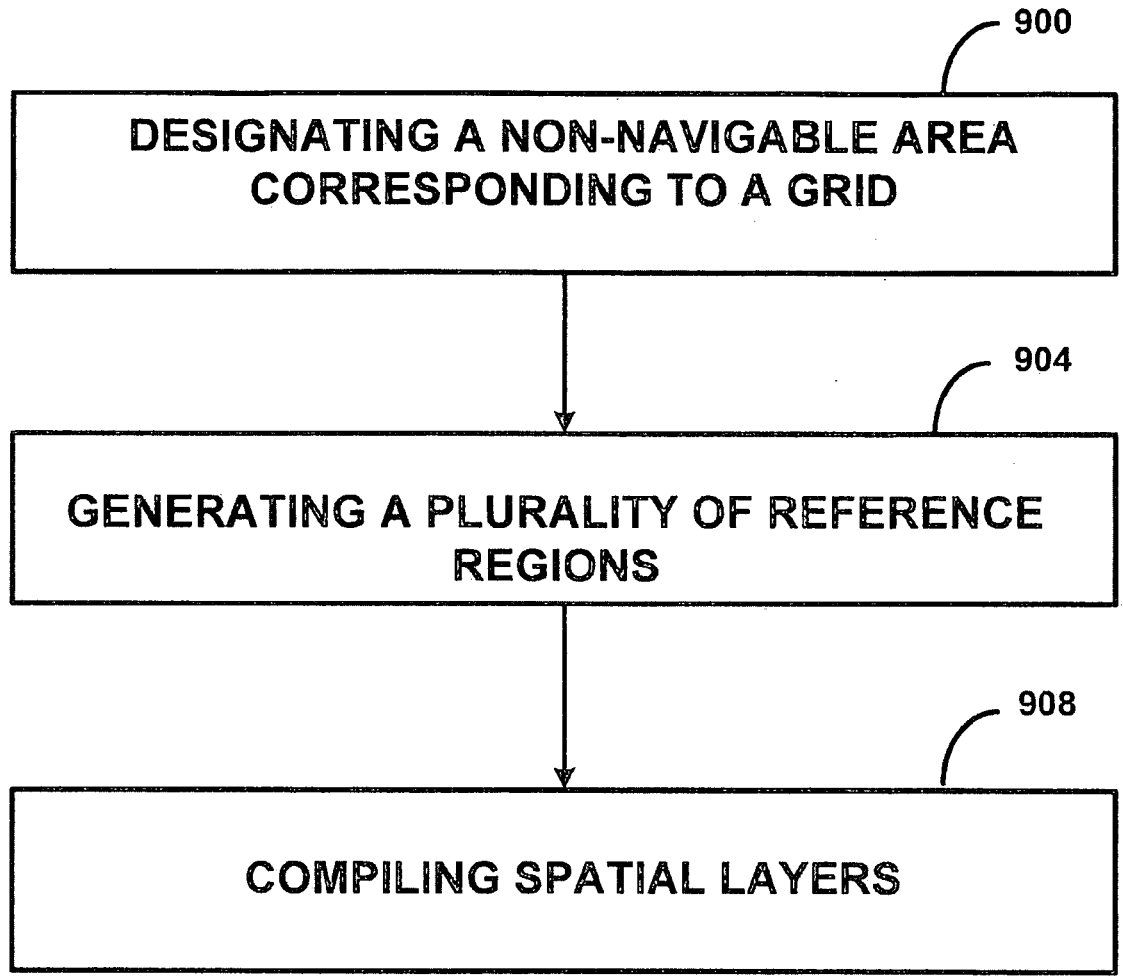
FIG. 13 is a flowchart showing an example of a step of the method of FIG. 12.

A routable map, such as the map 601 or 700, is generated or created by using the image of the layout, such as the image 201 (Step 809). FIG. 13 is a flowchart showing an example of a method for generating the routable map including steps that may be wholly or partially encompassed by Step 809. A non-navigable area is designated in the grid or mesh (Step 900). For example, the map developer clicks on or selects areas within the layout of the image to convert them to non-navigable tiles or areas, such as the non-navigable tiles or areas 401. The map developer may select images of walls or barriers that cannot be walked through in the real world as non-navigable areas. The selection may assign tiles with a non-navigable status or may remove tiles. The designation of non-navigable areas may also be automated. For example, instead of selecting multiple areas in the image to be non-navigable, the map developer may click on or select a wall or barrier to be non-navigable and all other features or image objects with the same or similar color or pixel level of the selected wall or barrier may automatically be associated with non-navigable areas or tiles. Alternatively, pre-determined color or pixel levels or image recognition factors may be entered so that non-navigable tiles or areas are automatically generated once a grid is overlaid without involvement of a map developer or other entity. In such automated cases, graphical representations of text or descriptions of image objects in the layout may be removed or separated prior to designation of non-navigable areas. This is so because the descriptions may be mistakenly assigned as non-navigable areas. Alternatively, a non-navigable area may be designated by originally not applying a grid or a portion thereof to areas intended to be non-navigable.

A plurality of reference regions or areas are generated (Step 904). The generation of the reference regions occurs on a different spatial layer than the grid or mesh. The grid or mesh may or may not be viewed when creating the plurality of reference regions. In one embodiment, the plurality of reference regions are automatically or semi-automatically generated. For example, a plurality of reference image objects are identified or determined in the image, such as the image 201, which may be a raster image or a vector graphics image. A raster image of the layout is binarized. Binarization of the image allows for logically comprehending the layout by using digital 1's and 0's. For example, a Trier-Taxt binarization is used. The Trier-Taxt binarization provides for edge preservation. Alternatively, other binarization techniques or methods may be used. The binarization may depend on three parameters or factors, such as a sigma, an activity threshold, and a pruning factor. Alternatively, more or less factors may be considered.

The sigma is a larger sigma rather than a lower sigma that may correspond to noise sensitivity. Activity at a pixel may be proportional to a local average of a gradient magnitude, and pixels with lower activity than the activity threshold may be set to zero. The pruning factor is used for removing small connected components. In one embodiment, the sigma is set to about 1, the activity threshold is set to about 2, and the pruning factor is set to about 1. Alternatively, the factor values may be set to any other value and may be adjustable.

Regarding identification of the reference image objects, a text/graphics separation is performed after binarization. For example, the graphical description or text corresponding to each of the reference image objects is separated from the respective image objects. Any future or past graphics-text separation may be used. The separated text is linked to or identified with the respective image object. For example, a text region may be designated in each of the reference image objects. After the separation, OCR is performed on all or some of the graphical descriptions to convert them into searchable text, such as the text 504, or text that can be recognized as having meaning or a definition rather than a graphical representation of text. Separation of the graphical descriptions may facilitate or improve the OCR. Alternatively, the OCR may be performed without the separation. Text aliasing may be reduced by doubling or increasing resolution of the original image of the layout, such as by using Lanczos re-sampling before applying OCR. In alternate embodiments, other text recognition methods, functions, or algorithms may be used.

The plurality of reference regions, such as the reference regions 500, are generated by forming borders or boundaries corresponding to the respective reference image objects. For example, after binarization and/or graphical description separation, the reference image objects are vectorized. Lines or vectors are generated or created between the digital or binarized data points to form shapes corresponding to the image objects within the layout. For example, the Rosin and West vectorization algorithm is used. Alternatively, other future or past vectorization algorithms may be utilized.

Closed polygons are identified to determine the reference regions associated with the original reference image objects. For example, based on the vectorization, closed polygons or other shapes are determined. The closed polygons may be determined via planar curve, vertices, edge, and/or face techniques. Any future or past computational-geometry algorithms or methods may be used. A closed polygon may correspond to an office, a room, or other area.

Some reference image objects may include gaps or symbols of doors, such as the gaps or symbols 249 and 253. For the purpose of determining reference regions, all line segments identified in the vectorization may be visited to determine or identify gaps that can be closed to form a closed polygon. The gaps are closed to identify the respective reference regions. Regarding symbols of doors, the map developer may identify or provide information that links a unique symbol, such as the symbol 253, to a door, opening, entrance, and/or exit. The association may be stored in a memory or look-up-table. After or during vectorization, the symbols of the doors can be identified based on matching and replaced with gaps. The gaps are then closed to identify the respective reference regions. Alternatively, a line or vector replaces the symbol of the door to close the polygon rather than forming a gap and then closing the gap. Multiple gaps or symbols of doors for a given image object may be visited or closed to form a closed polygon for determining a reference region. The gaps or symbols of doors correspond to navigable tiles on the grid that is in a separate spatial layer relative to the reference image objects. The doors or openings may be inferred by comparing the navigable tiles of the grid with respective reference regions.

The names or text associated with each of reference image objects are populated in a name attribute corresponding to the generated reference regions. For example, the text generated from the OCR is associated with text regions of the generated reference regions. A look-up-table, database, or other memory feature links the text descriptions to each respective reference region. A question and answer feature or a verification function may be implemented so that the map developer can correct errors in the generated text or association of text with reference regions. A reference region may be searchable based on the associated text and vice versa.

The reference regions may also be associated with a reference type. For example, each reference region may correspond to or be designated a type, such as a restaurant, office, department store, grocery store, bathroom, or other designation, based on the associated text, function, purpose, and/or other factors of the reference region. These types or keywords may be stored in a database or look-up-table and may be linked or associated with respective reference regions. The type or tag may be more specific, such as particular names of stores or areas (e.g., McDonalds™ restaurants) that may or may not be different than the generated text or name. Also, logos and/or respective websites may be associated with the reference regions. A reference region may be associated with one or more types or tags and may be searchable based on the types or tags.

The reference regions and associated text and type may be generated manually instead of or in addition to being automatically generated. For example, the map developer, using program or application tools, may outline or replicate the reference image objects in the original image of the layout to generate the reference regions, such as the reference regions 500, in a spatial layer separate from the grid or mesh. Also, the map developer may read or view the original descriptions of the reference image objects and enter, input, or type in equivalent text, such as the text 504, and/or types to be associated with the generated reference regions.

The generated data or data layers associated with a digital open area map, such as the grid or array and the reference regions are stored, such as in the database 170. Separate data or spatial layers may be stored as individual XML files or other data. For example, data corresponding to the underlying image, the grid, restrictions, and the reference regions are saved or stored. Position or location information or data corresponding to the grid or respective tiles (such as regular-sized tiles) as well as the restrictions and reference regions are also saved and/or provided in the data structure. The position information is used as a spatial reference regarding appropriate location of the different data entities. The position information may be based on an original scale, a reference, or coordinates, such as relative to the underlying image. The database 170 may compile the separate data layers to form a routable open area map. Accordingly, the database 170 may stream or send the compiled open area map data to the end user device. Alternatively, separate data layers may be sent to the end user device for compilation on the end user device. Also, a compiled open area map file or data may be stored in the database 170 rather than storing separate data layers.

Different spatial or data layers are compiled or combined to form an open area map, such as the open area map 601 or 700, that is routable (Step 908). For example, restrictions or conditional barriers, such as the restriction 509, are compiled with the grid/mesh, reference regions, and/or other data or spatial layers. Also, the plurality of reference regions including the associated text and tags are compiled with the grid or mesh and/or generated restrictions. The compilation links or associates respective tiles to the generated restrictions and/or generated reference regions (such as tiles that are to be adjacent to a restriction, intersecting or touching a restriction, within a restriction, within a reference region, substantially adjacent to the reference region, and/or touching or intersecting a border of the reference region) for search, navigation, routing, and other purposes. The compilation allows for knowing when a restriction or barrier applies when moving from one tile to another. Also, connections or connections points, which may be generated on a separate spatial layer, may be compiled with generated restrictions, the grid, and/or the plurality of reference regions. Other components or features, such as cost features, that may be on separate or different spatial layers may also be compiled with the grid or mesh or other layers. Any future or past compilation technique or method may be used. Alternatively, the grid, restrictions, reference regions, and/or connection points, as well as other features, may be generated and exist on the same spatial or data layer rather than different layers. Accordingly, a final compilation may not be required. Also, some spatial layers may not be compiled or may not be used. For example, routing may be accomplished using navigable and non-navigable tiles without associating the tiles with generated reference regions or restrictions.

Referring back to FIG. 12, another or second graphical representation or image of a layout, such as an image similar to the image 201, is obtained or received (Step 813). For example, the second image may be an image of a floor plan of another floor of the building (e.g., the image obtained at Step 801 represents one floor of a building and the image obtained at Step 813 represents another floor of the building). The second image may be obtained or received by the map developer in a similar manner as the first image was obtained at Step 801.

Another grid, mesh, or array is applied to the second image (Step 817), such as applying the grid at Step 805. Also, one or more restrictions may or may not be generated. Another or second routable map is generated by using the second image (Step 821), such as generating the first routable map at Step 809. The first and second routable maps are linked or associated with each other, such as via one or more connections or other features (Step 825). For example, a connection point in the first routable map is associated with a connection point on the second routable map for routing purposes. The connection points may correspond to an elevator connection, such as the connection points 613 and 708, or other connection linking two floors of a building or other areas. Alternatively, one or the same connection point is used to link the two routable maps. Any number of routable maps may be linked together via one or more connection points or other features (e.g., 1 to an Nth number of routable maps corresponding to different floors of a building or other areas may be generated and linked or associated together).

Figure 14:
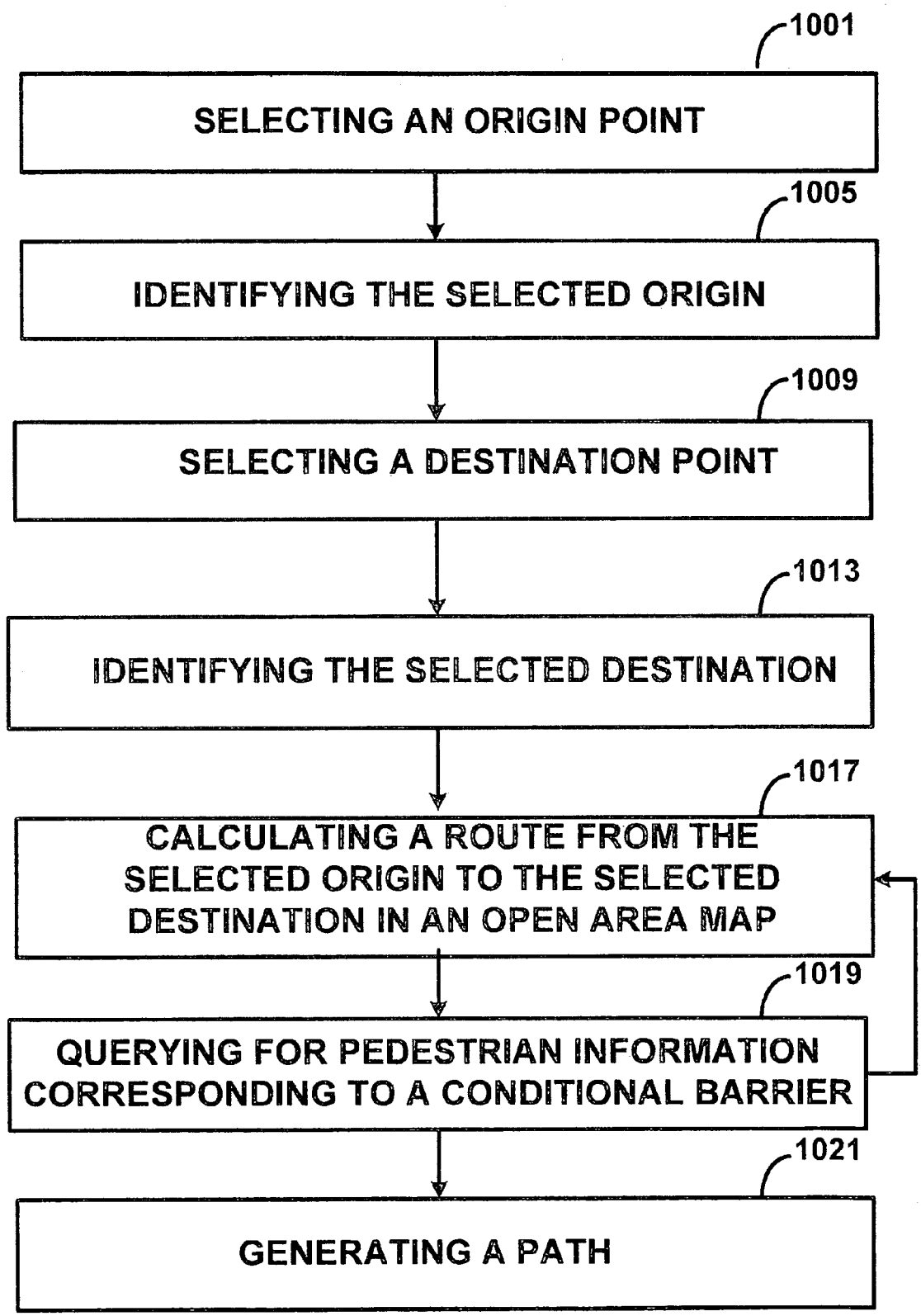
FIG. 14 is a flowchart of a method of routing in an open area map.

FIG. 14 is a flowchart of a method of routing in an open area map, such as the open area map 601 or 700. Fewer or more steps or acts may be provided, and a combination of steps may be provided. Also, the steps or acts may be performed in the order as shown or in a different order. The method is implemented by the system and/or devices described herein or by different devices or systems.

In one embodiment, an end user, such as a pedestrian, uses a device, such as the device 116, for point-to-point routing or navigation in an open area. For example, one or more routable open area maps or data thereof, such as the open area map 601 or 700, are downloaded or sent to the end user device, such as via the connection 120 or other connection. Alternatively, one or more routable open area maps are "pushed" onto the user device via a proximity beacon or transmitter or other device based on location or position.

The user views one or more open area maps, such as via the display 140. The user may enable or turn on a restriction feature that allows the open area map to consider restrictions, such as the restriction 509, when routing. Alternatively, the open area map may always consider the restrictions. The user may enter or input information related to or corresponding to any restrictions associated with one or more open area maps. For example, the user enters or selects from a category a weight, a height, other physical content, how much money he or she has (e.g., in the form of cash, credit, debit, or check), a time the user wants to be routed or travel within the layout, and/or other information.

An origin or origin point, such as the origin point 609, is selected (Step 1001). For example, the user types in or enters an area or point of origin that acts as a starting location for routing. The user may enter a name or text describing a reference region, and the respective area in the open area map may be allocated as the origin point based on searching or accessing a look-up-table linking reference regions with names or text. Alternatively, the user may click on, select, or physically touch an area on the open area map (i.e., touch the display screen) to choose the origin point.

The origin selected in the open area map is identified (Step 1005). For example, one or more tiles associated with the origin point or reference region associated with the origin point is determined, considered, recognized, targeted, focused upon, and/or highlighted for route calculation.

A destination or destination point (i.e., the place or area the user wants to be routed to), such as the destination point 712, is selected (Step 1009) by the user in a similar manner to selecting the origin point or through different methods. The destination selected in the open area map is identified (Step 1013) in a similar manner to identifying the origin point or through different methods.

A route from the selected origin to the selected destination in the open area map is calculated (Step 1017). For example, adjacent or connected tiles that are navigable, such as the tiles 304, are assessed to determine an optimum or preferred route from the origin point to the destination point. Non-navigable areas or tiles, such as the tiles 401, are avoided or routed around. One or more possible routes may be calculated using geometric and/or mathematical functions or algorithms. For example, centers or other locations of each of the tiles are connected or associated with each other to form potential routes. An optimum route is chosen based on distance as well as other factors, such as cost, restrictions, or user preferences that may be inputted (e.g, a user may want a route to avoid or pass by a desired area). The user preferences may be based on classification or sub-classification of tiles. For example, each or some tiles are associated with a feature related to position, location, and/or type of area (e.g., major, intermediate, or minor corridor, hallway, pathway, or area, high or low traffic area, unpopular or popular area, scenic area, narrow area, isolated area, sloped area, flat area, carpeted area, or size, length, or width of an area). The tiles may also be sub-classified based on what reference regions or areas they are linked to, proximate to, or pass by. Different tiles may be ranked or ordered based on the sub-classification. In one embodiment, the user may input or choose to avoid high traffic areas or major corridors when routing.

A Dijkstra method, an A-star algorithm or search, and/or other route exploration or calculation algorithms may be used to form lines, curves, or routes between the points of the connected tiles. A Douglas-Peucker method or algorithm may be used to smooth or simplify the calculated lines or routes. For example, by connecting the center of adjacent tiles together, jagged, sharp, or triangular edges may be formed in the route from the origin point to the destination point. To minimize distance and provide a smooth line or curve for the route, the Douglas-Peucker algorithm can find or provide an averaged route from the origin to the destination. The Douglas-Peucker algorithm is modified to avoid non-navigable tiles and may be adjusted to change threshold levels for line smoothing or averaging. Alternatively, other line smoothing algorithms or methods may be used.

Calculated routes and generated paths may be saved or stored for future use. For example, once a path is generated, it may be saved as a pre-determined path that can be reused when a user desires to be routed from the same origin to the same destination. Some, rather than all, paths or routes may be saved. For example, routes or paths between major or popular reference regions may be stored while paths regarding less traveled or minor reference regions may not be stored. Also, partial routes or paths may be stored in which some parts of the path, not the entire path, are saved. Additionally, routes or paths between connections or connection points may be pre-calculated or predetermined and stored for routing. For example, a user may want to route from one point to another in which one or more connections may be used. In this case, a route is calculated from an origin to a connection as well as from the other connection to the destination, and the route between the connections has already been calculated, which saves time and processing. Routes may be stored, saved, ranked, or ordered in multiple data layers. For example, higher layers may include main, major, or more important routes. Alternatively, routes and paths are always recalculated and regenerated.

Before, during, or after calculation of the route, pedestrian or user information (e.g., can be information of a cyclist or someone in a wheelchair or other mobile assistance device) corresponding to a conditional barrier or restriction, such as the restriction 509, may be queried or retrieved (Step 1019). For example, user or pedestrian information already entered or inputted prior to routing may be retrieved or queried from memory or other storage device. Based on the user information, the open area map may determine whether to perform or continue route calculation through the restricted area or tiles associated with a restriction or determine whether or not the calculated route that passes through the restriction is viable to the user. Alternatively, the open area map may query or ask a user for information related to criteria for the restriction during routing. For example, the open area map may begin route calculation and encounter a restriction or a tile associated with a restriction. Based on the encounter, the user is notified of the restriction and asked to enter or select relevant information. Such notification or query may include an audio and/or a visual signal, content, or display (such as text or a separate window or screen). After the notification, pedestrian or user information is received (e.g., the user enters or inputs pedestrian or user information related to or associated with the restriction or criteria thereof).

Instead of or in addition to user information, time of day or temporal information may be used when calculating routes through restrictions. For example, instead of a user entering a time he or she wishes to travel or walk around in the layout, the open are map or associated user device, such as the user device 116, determines or identifies a real-world time of day corresponding to the layout. If the determined time is an appropriate time for one to pass through the restriction, a route is calculated through the restriction. However, if the determined time corresponds to an inappropriate time (e.g., a gate or door is locked at an off time, such as midnight), then a different route bypassing the restriction is calculated. Also, an estimated time of arrival at the restriction using the route is used to determine if a time-based restriction is applicable. The user would supply the starting time of the route (say for a future day) or in the case of real-time routing, the current time would be used, and then the estimated time of arrival is used for applying or not applying the restriction.

When bypassing any one restriction, a new or different route calculation may take place. Before, during, or after the new route calculation, other restrictions that may exist in the open area map may be considered. For example, different or similar user or time information may be queried or retrieved based on encountering other or different restrictions.

A path is generated based on the calculation and restriction or information thereof (Step 1021). For example, a path, such as the path 620 (FIG. 9), may be generated based on information entered or inputted prior to routing. Alternatively, half or a portion of a path (such as the path 640 (FIG. 10) or no path may be generated before a user is prompted or queried for restriction information or before restriction information is received. Also, a re-routed, recalculated, or new path (such as the path 644 (FIG. 11)) may be generated based on the user information, user choice, time information, or other content.

In regards to generating a path, all of the tiles associated with an optimum or preferred route are identified or determined as the path. For example, the Douglas-Peucker algorithm or other algorithm may form a line and/or curve that passes over certain navigable tiles. Those tiles are then identified, entered, stored, or highlighted as the path for the user to take to go from the origin point to the destination point. The determined path then is displayed, such as the displayed path 605 or 704, to the user in the open area map for routing purposes.

In one embodiment, the user may receive partitioned data when using the open area maps for routing and/or navigation. User devices, such as the device 116, may include resource constrained components in which processing speeds, memory, or other features may not be as high, fast, or large as other devices. Accordingly, instead of downloading or executing all the data associated with multiple open area maps at the same time, data may be received or executed on an as needed basis. For example, a user may download or initiate one open area map or a portion thereof when beginning navigation (e.g., a first floor or a part of the first floor including the origin is displayed or loaded for routing). Then when the user enters or is routed to a connection or connection point (e.g., to go to a second or other floor or area), the connected open area map data is then downloaded or initiated for continuing the routing process. Also, different spatial layers or features of an open area map may be downloaded or executed on a partitioned basis or at different times.

The open area maps discussed above may or may not include navigation related attributes or nodes and road or path segments that are collected and organized into a geographic database, such as used for in-vehicle navigation systems, portable navigation devices, real-world vehicle navigation maps, and/or real-world pedestrian navigation maps. The navigation attributes may include turn restriction content, speed limit information, optimal or popular path data, footpath content, sign information, and/or other attributes for performing navigation related functions, such as route calculation, destination time calculation, route guidance, and/or other real-world navigation functions.

The open area maps may be connected or in communication with real-world vehicle and/or pedestrian maps or map data that are based on or include collected and organized navigation attributes and/or nodes and links or road/path segments. For example, an open area map of a floor of a building, a building, or other open area map may connect to a road network map for routing and navigation purposes. A user may use a device to route within a building floor to navigate him or her to an outside area, such as the area 205 (FIG. 2). Once the user reaches the outside area, the user may want to use a set road network to navigate to another part of a city or other location. The user's device or other device that can communicate with the user's device may execute, bring up, or show a vehicle navigation map that performs navigation related functions regarding the road network. Any combination of open area maps and navigation maps or data based on collected attributes may be connected with each other for routing and/or navigation purposes.

Alternatives

In the description above, the open area maps used for routing focus on building floors or floor plans. However, the features described may be used for any number of open areas. For example, images of layouts of parks and outdoor environments may be obtained and used to generate routable maps, as described above. Different sections of a park, such as picnic areas, jungle gyms, slides, restrooms, and other areas, may be defined as separate reference regions. Therefore, routing can be generated over grassy areas similar to routing between offices mentioned above. Parks may have walking paths that may be incorporated in routing. Alternatively, pre-determined walking paths or routes may be avoided in routing. Also, non-navigable tiles may be used or implemented for borders or barriers. For example, lakes, ponds, or other water areas in the park may be bordered with non-navigable tiles so that one is not routed through water. Other barriers or desired boundaries, such as hazardous areas, train tracks, or rocks, may be associated with non-navigable tiles. Alternatively, navigable tiles may be used if there is a reason to pass through some of these boundaries. For example, if a boat exists to take a person from one side of a lake to another, then a boat area may be associated with navigable tiles.

The tiles or objects associated with the image of a park or outside area may be sub-classified. For example, some tiles may be associated with grass areas and some tiles may be associated with sidewalks. A user or other entity may input a preference, such as grass only, sidewalk only, or other designation, for routing purposes. Accordingly, routes may be generated by avoiding or using certain specified tile types (e.g., generating a route over only grass areas and avoiding sidewalks or vice versa). Also, restrictions, such as the restriction 509, may be associated with entrances, exists, passageways, or events of the park.

In another embodiment, a pre-exiting image of a parking lot may be obtained and used to generate a routable open area map. Each of the individual parking spaces may correspond to different reference regions. The outlines of the parking spaces may be considered barriers that may or may not be associated with non-navigable tiles. For example, the outlines of the parking spaces may be designated as non-navigable areas so that a route is not generated through parking spaces (e.g., for safety to pedestrians, cyclists, or others, and also for practicality because the spaces may be filled with cars). However, certain areas of the outlines of the parking spaces may be designated as navigable to simulate the concept that pedestrians may walk or navigate between parked cars. The parking lot may have multiple levels of parking floors, which may be associated with each other via a connection, such as the connection 405, 613, or 708, representing an elevator, stairs, or other connection. Also, restrictions, such as the restriction 509, may be associated with entrances, exists, or areas of the parking lot (e.g., parking lot gates or doors associated with a fee or access code or card).

Other areas or environments may be used to generate routable open area maps. For example, pre-existing images of amusement parks, malls, museums, and other indoor or outdoor areas may by obtained and used for generating routable maps or plans. In one embodiment, an image of a trade show area or floor plan or other temporary layout may be obtained. For example, the layout setup for a trade show may last or exist for only about a week, less than about 3 months, or other time periods. The image of the temporary layout may be obtained and used to generate a routable open area map as described above. Therefore, after a certain time period (such as less than about 3 months or other temporary time period), the generated routable map may no longer be applicable for the location or area. Also, the generated open area map may be time boxed based on the time period of the temporary layout. For example, the open area map or portions thereof, such as reference regions or other features, may disappear, be erased, or be inoperable when the actual layout is changed or taken down after the allocated time period. The open area map or features thereof may be erased by the executing device based on a timer within the device or a communication or signal from an outside source. Also, events or features associated with certain reference regions may be time boxed or used to time box the specific reference regions. For example, a speech, show, or activity may occur at a specific area (e.g., reference region) for a certain time period. Accordingly, the reference region may be only routable or may only exist for the specific time period associated with the speech, show, or activity. In another alternate embodiment, reference regions may be mobile, such as a mobile truck or moveable store, which makes the reference regions temporary for a specific location. Or, reference regions may be routable for a temporary time period based on how long an item is on sale for a given reference region, store, or stall.

In the description above, the application of the grid or mesh focuses on, but is not limited to, a two-dimensional format. The grid or mesh may be a three-dimensional grid or mesh including points or coordinates in an x, y, and z direction (e.g., the coordinates may include longitude, latitude, and altitude information or local coordinates). For example, the image of the layout obtained may include three-dimensional features. For example, a floor plan may have floor ramps, steps or stairs, a bi-level area, or other features that are displayed or designated in three-dimensional space. Also, a hill or peaks and valleys in a park area may be displayed or provided in a three-dimensional space. Therefore, a three-dimensional grid or mesh may be applied on or over the image to generate a routable open area map as described above. The addition of the z direction may require additional calculation for determining a route and/or path. For example, height may be a factor in determining an optimum or preferred route. Instead of using square tiles, triangular sections or tiles may be used for the three-dimensional grid or mesh. Alternatively, other geometrical shapes may be utilized.

A three-dimensional grid or mesh may be used for routing a person from one point to another in addition to helping a person find an object. For example, images of layouts of a grocery store or retail store having vertical shelves of products and goods may be obtained. A three-dimensional grid may be applied in which the floor area is overlaid with two or three dimensional tiles, and the vertical shelving areas are overlaid with a grid or mesh as well. Different products or goods on the shelves may be designated as reference regions. Accordingly, an open area map may be generated that can route a shopper or user to one place in the store to another place where a product can be found on a proximate or nearby shelf. Then a route can be calculated on the grid over the shelf or vertical area pointing to the specific or selected product. The shopper or user may not walk on the shelf, but the route may be useful in showing the shopper or user where exactly the product is on the shelf. Or, a route can be calculated to end at a ground or floor tile that is nearest to the shelf.

In another embodiment, instead of and/or in addition to using a grid, mesh, or array, as described above, color may be used to designate navigable and non-navigable areas. For example, the color white may be associated with navigable areas and the color black may be associated with non-navigable areas. Any number and types of colors may be used. Accordingly, routes may be calculated based on the placement of respective navigable and non-navigable colors. For example, paths or routes may be generated within navigable colored areas and around non-navigable colored areas based on distance algorithms. Also, different shades of color or gradation of color may be used as factors or cost for calculating or generating routes.

Furthermore, as described above, a map developer obtains an image and uses a workstation, computer, and/or device, such as the device 112, to generate a routable open area map. The open area map is then received by an end user or at an end user device, such as the user device 116. However, an end user or other entity separate from a map developer may obtain an image of a layout and generate a routable open area map automatically and/or manually. For example, an end user may obtain and/or purchase a software application for creating open area maps from a map developer or other entity. The device 112 (FIG. 1) may be operated by an end user, such as a personal computer. Alternatively, instead of using the device 112 to generate a routable open area map and sending the open area map to the user device 116 for use, the user device 116 may be used to generate and use a routable open area map, bypassing the device 112. Or, the device 112 and the device 116 may be combined into one device or system.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A method of generating an open area map, the method comprising:
   receiving an image of a layout corresponding to a real-world area in which a person walks about;
   applying a grid on the image of the layout, at least a portion of the grid designated as navigable and associated with a navigable area in the layout;
   applying a restriction associated to a passageway within the navigable area in the layout; and
   generating a routable map for point-to-point routing as a function of the grid and the restriction, wherein the point-to-point routing in the generated routable map includes calculating a route between any two points anywhere within the navigable area covered by the portion of the grid designated as navigable, and wherein routing through or around the restriction is based on whether or not criteria for passing the restriction is met.

2. The method of claim 1, wherein applying the restriction comprises forming a line having a length that covers the associated passageway.

3. The method of claim 1, wherein the restriction corresponds to a key, a badge, a code, a retinal scan, a finger print, a time of day, money, height, or weight.

4. The method of claim 1, wherein the criteria corresponds to information of a user of the open area map, the information corresponding to physical information, authorization information, or monetary information.

5. The method of claim 1, wherein the criteria corresponds to a time period.

6. The method of claim 1, wherein the criteria for passing the restriction is considered for only one direction through the restriction.

7. The method of claim 1, wherein the image of the layout comprises an image of a building floor plan.

8. The method of claim 1, wherein generating a routable map comprises:
   generating a plurality of reference regions; and
   compiling the plurality of reference regions and the restriction with the grid.

9. The method of claim 8, wherein generating the plurality of reference regions comprises:
   identifying a plurality of reference image objects in the image; and
   generating the plurality of reference regions by forming borders corresponding to the respective reference image objects.

10. The method of claim 9, wherein forming the borders comprises vectorizing a portion of a binarized image.

11. The method of claim 1, wherein the grid and the restriction are in separate spatial layers prior to compilation.

12. The method of claim 1, wherein the grid includes a plurality of tiles, and wherein calculating the route comprises calculating as a function of adjacent tiles of the grid.

13. The method of claim 1, wherein the routable map is configured to be displayed on an end user device.

14. A method of routing in an open area map, the method comprising:
   identifying a destination selected in the open area map, the open area map including an image of a real-world pedestrian area, wherein a grid of a plurality of tiles is associated with the image of the real-world pedestrian area, and wherein at least a portion of the grid is designated as navigable and associated with a navigable area in the real-world pedestrian area;
   calculating a route from an origin point to the selected destination in the open area map as a function of point-to-point routing, wherein the point-to-point routing includes calculating, based on adjacent tiles of the grid, a route between points within the navigable area covered by the portion of the grid designated as navigable, the point-to-point routing including route calculation not dependent upon one or more predetermined path segments; and
   querying for pedestrian information corresponding to a conditional barrier associated with the route or portion thereof.

15. The method of claim 14, wherein querying for the pedestrian information comprises notifying a user about the conditional barrier or a condition thereof via visual or audio content.

16. The method of claim 15, wherein the pedestrian information is received after the notification.

17. The method of claim 16, wherein a path through the conditional barrier and to the selected destination is generated if the pedestrian information meets the requirements of the conditional barrier.

18. The method of claim 16, wherein a route circumventing the conditional barrier is calculated if the pedestrian information does not meet the requirements of the conditional barrier.

19. The method of claim 14, wherein querying for the pedestrian information comprises retrieving the pedestrian information that is inputted prior to calculating the route.

20. The method of claim 19, wherein a path from the origin point, through the conditional barrier, and to the selected destination is generated if the pedestrian information meets the requirements of the conditional barrier.

21. The method of claim 19, wherein a path from the origin point to the selected destination that bypasses the conditional barrier is generated if the pedestrian information does not meet the requirements of the conditional barrier.

22. The method of claim 14, wherein the route is configured to be displayed within the open area map on an end user device.

23. The method of claim 14, wherein the one or more predetermined path segments comprise one or more path segments determined prior to the route calculation.

24. An open area map system comprising:

an image of a floor plan corresponding to a pedestrian area;

a grid associated with the image of the floor plan, wherein at least a portion of the grid is designated as navigable and associated with a navigable area in the floor plan; and a restriction barrier compiled with the grid, the restriction barrier corresponding to a real-world condition for passing through a sub-area of the navigable area, wherein the open area map is configured for point-to-point routing based, in part, on the restriction barrier, the point-to-point routing includes calculating a route between points within the navigable area covered by the portion of the grid designated as navigable, and wherein the point-to-point routing includes route calculation not dependent upon one or more predetermined path segments.

25. The open area map system of claim 24, wherein the grid includes a plurality of tiles, and wherein the restriction barrier is associated with at least one tile associated with a gate, an opening, a door, or a connection.

26. The open area map system of claim 24, wherein the grid includes a plurality of tiles, and wherein calculating the route comprises calculating as a function of adjacent tiles of the grid.

27. The open area map system of claim 24, wherein the route is configured to be displayed within the open area map on an end user device.

28. The open area map system of claim 24, wherein the one or more predetermined path segments comprise one or more path segments determined prior to the route calculation.

\* \* \* \* \*